US012387030B2

(12) United States Patent
Ho et al.

(10) Patent No.: US 12,387,030 B2
(45) Date of Patent: Aug. 12, 2025

(54) METHOD AND APPARATUS TO LAYOUT SCREENS OF VARYING SIZES

(71) Applicant: IpLContent, LLC, Mountain View, CA (US)

(72) Inventors: Chi Fai Ho, Palo Alto, CA (US); Peter P. Tong, Mountain View, CA (US)

(73) Assignee: IpLContent, LLC, Mountain View, CA (US)

( * ) Notice: Subject to any disclaimer, the term of this patent is extended or adjusted under 35 U.S.C. 154(b) by 0 days.

(21) Appl. No.: 18/746,722

(22) Filed: Jun. 18, 2024

(65) Prior Publication Data

US 2024/0346229 A1 Oct. 17, 2024

Related U.S. Application Data

(63) Continuation of application No. 17/729,704, filed on Apr. 26, 2022, now Pat. No. 12,045,558, which is a
(Continued)

(51) Int. Cl.

| | |
|---|---|
| ***G06F 17/00*** | (2019.01) |
| ***G06F 3/01*** | (2006.01) |
| ***G06F 3/0483*** | (2013.01) |
| ***G06F 15/02*** | (2006.01) |
| ***G06F 40/103*** | (2020.01) |

(Continued)

(52) U.S. Cl.
CPC ............ *G06F 40/114* (2020.01); *G06F 3/011* (2013.01); *G06F 3/0483* (2013.01); *G06F 15/0291* (2013.01); *G06F 40/103* (2020.01); *G06F 40/106* (2020.01); *G06F 40/123* (2020.01); *G06F 40/169* (2020.01)

(58) Field of Classification Search
CPC .... G06F 40/114; G06F 40/103; G06F 40/123; G06F 40/169; G06F 40/106
See application file for complete search history.

(56) References Cited

U.S. PATENT DOCUMENTS 5,802,516 A 9/1998 Shwarts et al.
6,124,851 A 9/2000 Jacobson
(Continued)

FOREIGN PATENT DOCUMENTS

EP 3190476 A1 7/2024

OTHER PUBLICATIONS

Office Action for U.S. Appl. No. 14/203,302, dated May 6, 2015.
(Continued)

*Primary Examiner* — Mohammed H Zuberi

(57) ABSTRACT

Different methods and apparatuses applicable to prepare materials for a user. One embodiment includes a device, with an imaging sensor. Based on analyzing a user attribute from the imaging sensor monitoring the user, the device can identify and access an area of the materials for the user. The area includes a section, and the device can layout the section by keeping a piece of text together with an illustration to be displayed in at least two screens of different sizes. Another embodiment includes materials received by a mobile device with a text sub file including a piece of text, an illustration sub file including an illustration, and computer instructions to layout materials for the user in the mobile device, with at least the illustration linked to the piece of text. Annotations could be included in the layout.

42 Claims, 19 Drawing Sheets

Related U.S. Application Data continuation of application No. 17/160,714, filed on Jan. 28, 2021, now Pat. No. 11,366,955, which is a continuation of application No. 16/692,101, filed on Nov. 22, 2019, now Pat. No. 11,074,393, which is a continuation of application No. 15/079,911, filed on Mar. 24, 2016, now Pat. No. 10,503,812, which is a continuation of application No. 12/804,875, filed on Jul. 30, 2010, now Pat. No. 9,330,069.

(60) Provisional application No. 61/338,991, filed on Feb. 27, 2010, provisional application No. 61/336,156, filed on Jan. 16, 2010, provisional application No. 61/283,687, filed on Dec. 8, 2009, provisional application No. 61/281,063, filed on Nov. 12, 2009, provisional application No. 61/278,952, filed on Oct. 14, 2009.

(51) Int. Cl.

| | |
|---|---|
| ***G06F 40/106*** | (2020.01) |
| ***G06F 40/114*** | (2020.01) |
| ***G06F 40/123*** | (2020.01) |
| ***G06F 40/169*** | (2020.01) |

(56) References Cited

U.S. PATENT DOCUMENTS

| | | | |
|---|---|---|---|
| 6,144,380 | A | 11/2000 | Shwarts et al. |
| 6,243,071 | B1 | 6/2001 | Shwarts et al. |
| 6,832,352 | B1 | 12/2004 | Dooley |
| 6,886,036 | B1 | 4/2005 | Santamaki et al. |
| 6,940,497 | B2 | 9/2005 | Vincent et al. |
| 7,287,220 | B2 | 10/2007 | Kaasila et al. |
| 7,350,704 | B2 | 4/2008 | Barsness et al. |
| 7,453,416 | B2 | 11/2008 | Muramatsu et al. |
| 7,748,634 | B1 | 7/2010 | Zehr et al. |
| 7,861,166 | B1 | 12/2010 | Hendricks |
| 7,916,124 | B1 | 3/2011 | Wood et al. |
| 8,423,889 | B1 | 4/2013 | Zagorie et al. |
| 8,743,021 | B1 | 6/2014 | Park et al. |
| 8,773,389 | B1 | 7/2014 | Freed |
| 8,826,169 | B1 | 9/2014 | Yacoub et al. |
| 9,107,083 | B1 | 8/2015 | Ledet |
| 9,330,069 | B2 | 5/2016 | Ho et al. |
| 9,400,549 | B2 | 7/2016 | Ho et al. |
| 9,430,141 | B1 | 8/2016 | Lu et al. |
| 9,569,549 | B1 | 2/2017 | Jenkins et al. |
| 10,261,575 | B2 | 4/2019 | Ho et al. |
| 10,503,812 | B2 | 12/2019 | Ho et al. |
| 10,606,346 | B2 | 3/2020 | Ho et al. |
| 10,831,982 | B2 | 11/2020 | Ho et al. |
| 11,074,393 | B2 | 7/2021 | Ho et al. |
| 11,366,955 | B2 | 6/2022 | Ho et al. |
| 11,416,668 | B2 | 8/2022 | Ho et al. |
| 11,630,940 | B2 | 4/2023 | Ho et al. |
| 12,026,446 | B2 | 7/2024 | Ho et al. |
| 12,045,558 | B2 | 7/2024 | Ho et al. |
| 12,099,643 | B2 | 9/2024 | Ho et al. |
| 2003/0220835 | A1 | 11/2003 | Barnes, Jr. |
| 2004/0140975 | A1 | 7/2004 | Saito et al. |
| 2004/0168126 | A1 | 8/2004 | Dunietz et al. |
| 2004/0205568 | A1 | 10/2004 | Breuel et al. |
| 2005/0055624 | A1 | 3/2005 | Seeman et al. |
| 2006/0031760 | A1 | 2/2006 | Jacobs |
| 2006/0041828 | A1 | 2/2006 | King et al. |
| 2006/0075345 | A1 | 4/2006 | Sherman |
| 2006/0156256 | A1 | 7/2006 | Lee |
| 2006/0200752 | A1 | 9/2006 | Sellers et al. |
| 2007/0011607 | A1 | 1/2007 | Lazareck et al. |
| 2007/0101263 | A1 | 5/2007 | Bedingfield |
| 2007/0171226 | A1 | 7/2007 | Gralley |
| 2008/0168073 | A1 | 7/2008 | Siegel et al. |
| 2008/0259057 | A1 | 10/2008 | Brons |
| 2008/0268416 | A1 | 10/2008 | Wallace et al. |
| 2008/0298083 | A1 | 12/2008 | Watson et al. |
| 2009/0300539 | A1 | 12/2009 | Hendricks |
| 2010/0003659 | A1 | 1/2010 | Edmonds |
| 2010/0211866 | A1 | 8/2010 | Nicholas et al. |
| 2010/0278453 | A1 | 11/2010 | King et al. |
| 2011/0102314 | A1 | 5/2011 | Roux |
| 2011/0119590 | A1 | 5/2011 | Seshadri |
| 2011/0167350 | A1 | 7/2011 | Hoellwarth |
| 2011/0175805 | A1 | 7/2011 | Rottler et al. |
| 2011/0261030 | A1 | 10/2011 | Bullock |
| 2011/0289395 | A1 | 11/2011 | Breuel et al. |
| 2012/0069131 | A1 | 3/2012 | Abelow |
| 2012/0105460 | A1 | 5/2012 | Kim |
| 2012/0127104 | A1 | 5/2012 | Jeon |
| 2012/0303603 | A1 | 11/2012 | Kim et al. |
| 2013/0007603 | A1 | 1/2013 | Dougherty et al. |
| 2013/0012306 | A1 | 1/2013 | Morin et al. |
| 2013/0031208 | A1 | 1/2013 | Linton |
| 2013/0169546 | A1 | 7/2013 | Thomas et al. |
| 2013/0174191 | A1 | 7/2013 | Thompson, Jr. et al. |
| 2013/0329183 | A1 | 12/2013 | Blum et al. |
| 2014/0172418 | A1 | 6/2014 | Puppin |
| 2014/0210855 | A1 | 7/2014 | Cohen |
| 2014/0372882 | A1 | 12/2014 | Broadbent, III et al. |
| 2015/0002372 | A1 | 1/2015 | Ortega et al. |
| 2015/0026176 | A1 | 1/2015 | Bullock |
| 2015/0066648 | A1 | 3/2015 | Kane, Jr et al. |
| 2015/0073907 | A1 | 3/2015 | Purves et al. |
| 2015/0120180 | A1 | 4/2015 | Park et al. |
| 2015/0160699 | A1 | 6/2015 | Choi et al. |
| 2015/0188997 | A1 | 7/2015 | Park et al. |
| 2015/0220205 | A1 | 8/2015 | Yun |
| 2015/0363365 | A1 | 12/2015 | Campbell |
| 2016/0109936 | A1 | 4/2016 | Lee |
| 2016/0203109 | A1 | 7/2016 | Ho et al. |
| 2016/0203110 | A1 | 7/2016 | Ho et al. |
| 2016/0306419 | A1 | 10/2016 | Ho et al. |
| 2018/0158460 | A1 | 6/2018 | Lee et al. |
| 2018/0196870 | A1 | 7/2018 | Mukherjee |
| 2019/0204908 | A1 | 7/2019 | Ho et al. |
| 2020/0089739 | A1 | 3/2020 | Ho et al. |
| 2020/0209956 | A1 | 7/2020 | Ho et al. |
| 2021/0150123 | A1 | 5/2021 | Ho et al. |
| 2022/0171454 | A1 | 6/2022 | Ho et al. |
| 2022/0207233 | A1 | 6/2022 | Ho et al. |
| 2022/0261531 | A1 | 8/2022 | Ho et al. |
| 2023/0237244 | A1 | 7/2023 | Ho et al. |

OTHER PUBLICATIONS

Office Action for U.S. Appl. No. 14/203,302, dated Aug. 26, 2015.
Advisory Action for U.S. Appl. No. 14/203,302, dated Nov. 24, 2015.
Ex Parte Quayle Action for U.S. Appl. No. 14/203,302, dated Feb. 10, 2016.
Notice of Allowance for U.S. Appl. No. 14/203,302, dated Apr. 20, 2016.
Office Action for U.S. Appl. No. 15/193,463, dated Mar. 8, 2018.
Office Action for U.S. Appl. No. 15/193,463, dated Jun. 21, 2018.
Notice of Allowance for U.S. Appl. No. 15/193,463, dated Aug. 10, 2018.
Ex Parte Quayle Action for U.S. Appl. No. 15/193,463, dated Nov. 13, 2018.
Notice of Allowance for U.S. Appl. No. 15/193,463, dated Feb. 11, 2019.
Office Action for U.S. Appl. No. 16/299,863, dated Apr. 1, 2019.
Notice of Allowance for U.S. Appl. No. 16/299,863, dated Jun. 10, 2019.
Notice of Allowance for U.S. Appl. No. 16/299,863, dated Aug. 13, 2019.
Notice of Allowance for U.S. Appl. No. 16/299,863, dated Nov. 18, 2019.
Office Action for U.S. Appl. No. 16/815,611, dated Sep. 1, 2020.
Office Action for U.S. Appl. No. 15/079,832, dated Oct. 4, 2017.
Office Action for U.S. Appl. No. 15/079,832, dated Feb. 5, 2018.

(56) References Cited

OTHER PUBLICATIONS

Office Action for U.S. Appl. No. 15/079,832, dated May 16, 2018.
Notice of Allowance for U.S. Appl. No. 15/079,832, dated Oct. 24, 2018.
Notice of Allowance for U.S. Appl. No. 15/079,832, dated Feb. 21, 2019.
Notice of Allowance for U.S. Appl. No. 15/079,832, dated May 29, 2019.
Notice of Allowance for U.S. Appl. No. 15/079,832, dated Nov. 18, 2019.
Notice of Allowance for U.S. Appl. No. 15/079,832, dated Jan. 23, 2020.
Notice of Allowance for U.S. Appl. No. 15/079,832, dated May 18, 2020.
Notice of Allowance for U.S. Appl. No. 15/079,832, dated Aug. 18, 2020.
Notice of Allowance for U.S. Appl. No. 15/079,832, dated Sep. 14, 2020.
Notice of Allowance for U.S. Appl. No. 17/060,676, dated Mar. 31, 2021.
Notice of Allowance for U.S. Appl. No. 17/060,676, dated Jun. 1, 2021.
Notice of Allowance for U.S. Appl. No. 17/060,676, dated Sep. 20, 2021.
Notice of Allowance for U.S. Appl. No. 17/060,676, dated Jun. 2, 2022.
Notice of Allowance for U.S. Appl. No. 17/695,253, dated Sep. 26, 2022.
Notice of Allowance for U.S. Appl. No. 17/695,253, dated Oct. 31, 2022.
Notice of Allowance for U.S. Appl. No. 17/695,253, dated Feb. 7, 2023.
Notice of Allowance for U.S. Appl. No. 15/079,911, dated Jan. 4, 2018.
Notice of Allowance for U.S. Appl. No. 18/128,409, dated Nov. 27, 2023.
Notice of Allowance for U.S. Appl. No. 18/128,409, dated Mar. 11, 2024.
Notice of Allowance for U.S. Appl. No. 15/079,911, dated Apr. 18, 2018.
Notice of Allowance for U.S. Appl. No. 15/079,911, dated Jul. 30, 2018.
Notice of Allowance for U.S. Appl. No. 15/079,911, dated Sep. 17, 2018.
Notice of Allowance for U.S. Appl. No. 15/079,911, dated Nov. 20, 2018.
Notice of Allowance for U.S. Appl. No. 15/079,911, dated Jan. 3, 2019.
Notice of Allowance for U.S. Appl. No. 15/079,911, dated May 8, 2019.
Notice of Allowance for U.S. Appl. No. 15/079,911, dated Aug. 12, 2019.
Notice of Allowance for U.S. Appl. No. 16/692,101, dated Aug. 18, 2020.
Notice of Allowance for U.S. Appl. No. 16/692,101, dated Nov. 25, 2020.
Notice of Allowance for U.S. Appl. No. 16/692,101, dated Jan. 4, 2021.
Notice of Allowance for U.S. Appl. No. 16/692,101, dated Apr. 15, 2021.
Notice of Allowance for U.S. Appl. No. 16/692,101, dated May 13, 2021.
Notice of Allowance for U.S. Appl. No. 17/160,714, dated Oct. 20, 2021.
Notice of Allowance for U.S. Appl. No. 17/160,714, dated Jan. 24, 2022.
Notice of Allowance for U.S. Appl. No. 17/160,714, dated Apr. 22, 2022.
Notice of Allowance for U.S. Appl. No. 17/729,704, dated Nov. 29, 2022.
Notice of Allowance for U.S. Appl. No. 17/729,704, dated Mar. 6, 2023.
Notice of Allowance for U.S. Appl. No. 17/729,704, dated May 24, 2023.
Notice of Allowance for U.S. Appl. No. 17/729,704, dated Aug. 11, 2023.
Notice of Allowance for U.S. Appl. No. 17/729,704, dated Nov. 27, 2023.
Notice of Allowance for U.S. Appl. No. 17/729,704, dated Jan. 22, 2024.
Notice of Allowance for U.S. Appl. No. 17/729,704, dated May 2, 2024.
Office Action for U.S. Appl. No. 17/671,797, dated Oct. 25, 2022.
Notice of Allowance for U.S. Appl. No. 17/671,797, dated Mar. 27, 2023.
Notice of Allowance for U.S. Appl. No. 17/671,797, dated Oct. 13, 2023.
Notice of Allowance for U.S. Appl. No. 17/671,797, dated Jan. 26, 2024.
Duffy, Maureen. "Google Glass Applications for Blind and Visually Impaired Users," VisionAware, http://www.visionaware.org/blog/visionaware-blog/google-glass-applications-for-blind-and-visually-impaired-users/12, Aug. 5, 2013.
Open Publication Structure (OPS) 2.0, v1.0, Recommended Specification Sep. 11, 2007, © 2007 International Digital Publishing Forum™, pp. 1-44, https://web.archive.org/web/20071231171445/http://www.idpf.org/2007/ops/OPS_2.0_final_spec.html, downloaded May 7, 2021.
Open Packaging Format (OPF) 2.0 v1.0, Recommended Specification Sep. 11, 2007, © 2007 International Digital Publishing Forum™, pp. 1-34, https://web.archive.org/web/20071231171454/http://www.idpf.org/ocf/ocf1.0/download/ocf10.htm, downloaded May 7, 2021.
OEBPS Container Format (OCF) 1.0, Recommended Specification Sep. 11, 2006, © 2007 International Digital Publishing Forum™, pp. 1-21, https://web.archive.org/web/20071231171439/http://www.idpf.org/2007/opf/OPF_2.0_final_spec.html, downloaded May 7, 2021.
Notice of Allowance for U.S. Appl. No. 18/753,645, dated Sep. 23, 2024.
Notice of Allowance for U.S. Appl. No. 17/671,797, dated May 8, 2024.

Sidious orders him to move the Separatist leaders to the volcanic planet Mustafar.
Kenobi arrives shortly after the Separatists leave, and corners Grievous. Grievous takes out his lightsabers and engages Kenobi in combat. Kenobi seems to gain the upper hand, fending off Grievous' lightsabers and slicing off his two lower hands at the wrists;

35

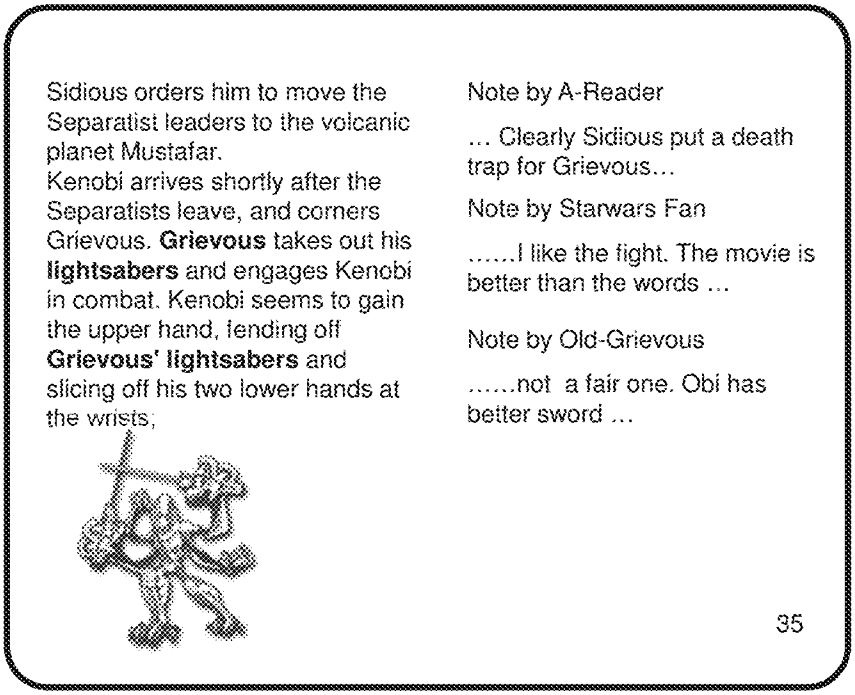

Figure 2

Sidious orders him to move the Separatist leaders to the volcanic planet Mustafar.
Kenobi arrives shortly after the Separatists leave, and corners Grievous. Grievous takes out his lightsabers and engages Kenobi in combat. Kenobi seems to gain the upper hand, fending off Grievous' lightsabers and slicing off his two lower hands at the wrists;

Note by A-Reader

... Clearly Sidious put a death trap for Grievous...

Note by Starwars Fan

......I like the fight. The movie is better than the words ...

Note by Old-Grievous

......not a fair one. Obi has better sword ...

35

Sidious orders him to move the Separatist leaders to the volcanic planet Mustafar.
Kenobi arrives shortly after the Separatists leave, and corners Grievous. Grievous takes out his lightsabers and engages Kenobi in combat. Kenobi seems to gain the upper hand, fending off Grievous' lightsabers and slicing off his two lower hands at the wrists;

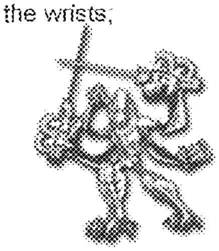

Grievous Fan Club

My Note

……blah blah blah …

Note by Yes-Grievous

……blah blah blah …

Text Sub File

```
...
<page page-no = "35"/>
  <paragraph>
Kenobi arrives shortly after the Separatists leave, and corners
Grievous.  <illustrated id="ani-4">Grievous</illustrated> takes out
his <illustrated id="ani-4">lightsabers</illustrated>
...
  </paragraph>
<page page-no="36"/>
...
```

Illustration Sub File

Illustration Descriptor

```
<illustration illustration-id="ani-4">
  <type>animation</type>
  <dimension>
    <horizontal min="64pixels"  max="100pixels"/>
    <vertical min="48pixels" max="60pixels"/>
  </dimension>
  <link>"grevious.swf"</link>
  <page page-no="35">
    <paragraph paragraph-no="2">
      <illustrated-text>Grievous, lightsaber, lightsabers</illustrated-text>
    </paragraph>
  </page>
</illustration>
```

Figure 8b

Annotation

```
<annotation id="note-15">
  <type>note</type>
  <page page-no="35">
    <paragraph paragraph-no="2">
      <illustrated-text>Grievous, lightsaber, lightsabers</illustrated-text>
    </paragraph>
  </page>
  <note>
      I like Grievous. He is so resourceful, tactical yet loyal.
  </note>
</annotation>
```

Figure 11

A collection of annotations from an author

```
<book-review>
  <author>Old-Grievous</author>
  <annotation id="note 1"> … </annotation>
  <annotation id="note 2"> … </annotation>
  …
  <annotation id="note 24"> … </annotation>
</book-review>
```

Figure 12

Logic Sub File

```
<script>
  DarkSideWords = { "Darth Vader", "Grevious", "Sith", "Emperor" }
  LightSideWords = { "Obiwan", "Yoda", "Force", "Jedi" }
  Favorites = ""
  LightSideCount = 0; DarkSideCount = 0;
  function UpdateFavorite()
  {
    recentWord = GetMostRecentSelectedWordFromReaderMonitor();
    if matchList (recentWord, DarkSideWords)
    {
      DarkSideCount += 1;
      if (DarkSideCount > LightSideCount)
        FavoriteSide = "DarkSide";
    }
    if matchList (recentWord, LightSideWords)
    {
      LightSideCount += 1;
      if (LightSideCount > DarkSideCount)
        FavoriteSide = "LightSide";
    }
  }
</script>
```

Figure 15

METHOD AND APPARATUS TO LAYOUT SCREENS OF VARYING SIZES

CROSS REFERENCE TO RELATED APPLICATIONS

This application claims benefit of (I) U.S. patent application Ser. No. 17/729,704, filed Apr. 26, 2022, now U.S. Pat. No. 12,045,558, and entitled "Method and Apparatus to Layout Screens of Varying Sizes," which is hereby incorporated herein by reference;

(II) U.S. patent application Ser. No. 17/160,714, filed Jan. 28, 2021, now U.S. Pat. No. 11,366,955, and entitled "Method and Apparatus to Layout Screens of Varying Sizes," which is hereby incorporated herein by reference;

(III) U.S. patent application Ser. No. 16/692,101, filed Nov. 22, 2019, now U.S. Pat. No. 11,074,393, and entitled "Method and Apparatus to Layout Screens," which is hereby incorporated herein by reference;

(IV) U.S. patent application Ser. No. 15/079,911, filed Mar. 24, 2016, now U.S. Pat. No. 10,503,812, and entitled "Method and Apparatus for Materials in Different Screen Sizes Using an Imaging Sensor," which is hereby incorporated herein by reference;

(V) U.S. patent application Ser. No. 12/804,875, filed Jul. 30, 2010, now U.S. Pat. No. 9,330,069, and entitled "Layout of e-Book Content in Screens of Varying Sizes," which is hereby incorporated herein by reference;

(VI) U.S. Provisional Patent Application No. 61/278,952, filed Oct. 14, 2009, and entitled "A Computer-aided dynamic reading and learning method and system," which is hereby incorporated herein by reference;

(VII) U.S. Provisional Patent Application No. 61/281,063, filed Nov. 12, 2009, and entitled "Computer-aided dynamic reading and learning method and system," which is hereby incorporated herein by reference;

(VIII) U.S. Provisional Patent Application No. 61/283,687, filed Dec. 8, 2009, and entitled "Computer-aided reading and learning methods and systems," which is hereby incorporated herein by reference;

(IX) U.S. Provisional Patent Application No. 61/336,156, filed Jan. 16, 2010, and entitled "Computer-aided reading and learning methods and systems," which is hereby incorporated herein by reference; and (X) U.S. Provisional Patent Application No. 61/338,991, filed Feb. 27, 2010, and entitled "Computer-aided reading and learning methods and systems," which is hereby incorporated herein by reference.

BACKGROUND OF THE INVENTION

Description of the Related Art

A number of companies have been introducing e-reading devices into the market. Typically books sold via such devices are cheaper than their corresponding paper versions. Also, such devices allow readers anytime access to huge number of books. They do not have to physically carry the books. Instead, the devices have the capacity to store lots of books, and can wirelessly download additional ones, even while the readers are on a train or waiting for an appointment. Publishers should be worried that the sales of their printed books would go down. However, after using the devices, many people are finding they miss the feel and touch of the paper books. Though such devices appear to have numerous advantages, the market is not experiencing a wide adoption of such devices to read books.

It should be apparent from the foregoing that there is still a need for a better reading and learning method and system for e-books.

SUMMARY OF THE INVENTION

In one embodiment, the present invention can provide an e-book reading devices for e-books with illustrations tied to their corresponding texts, with pagination preserved, with bookmarks available, and with annotations dynamically tailored to a reader and appropriately positioned for the reader, where notes from the reader can be easily captured and shared. The e-books can be childrens books, text books, cookbooks, journals, newspaper and many other reading materials or consolidations of different reading materials.

The invention can be implemented in numerous ways including, a method, system, device, and a computer readable medium. Other embodiments of the invention are discussed below.

One embodiment of a portable e-book reading device can dynamically paginate, linking and presenting text and illustration in pages on a screen of a display in a user-friendly way. Each page can be shown on one or more consecutive screens of the display, with the pagination maintained. The display can include a LCD display. In one embodiment, an illustration can be an animation or a video. In another embodiment, an illustration can be an audio file.

Another embodiment of a portable e-book reading device is configured for reading a paginated e-book, where each page includes one or more sections, each section includes an expression, and at least one section includes a piece of text linked to an illustration. The device includes a controller, a display configured to show a number of screens, an input mechanism to allow a reader to provide input into the device, and a screen layout module coupled to the controller and the display. The screen layout module can layout a number of pages of the e-book. In laying out the piece of text linked to the illustration, the screen layout module can at least keep the piece of text with the illustration to be displayed in one screen, and prevent the illustration from being split apart to be displayed in more than one screen. In addition, the screen layout module can maintain the pagination if a page is displayed in more than one consecutive screen. The display can be a LCD display. In one approach, the device can have more than one display. For example, one display can be an e ink display and the other a LCD display; one display can be for text and the other for illustration; and/or one for reading and the other for the reader to annotate.

In one embodiment, a reading device includes a note selector that can retrieve an annotation with position information regarding the annotation for an e-book. And a screen layout module can assemble the annotation to a position (based on the position information) in the e-book for display. The note selector can include an annotation of another person, such as from an e-book club. In one approach, a piece of text in an e-book is related to an annotation. If the reader highlights the piece of text, the annotation can be displayed.

One embodiment of a reading device includes a note editor that can assemble an annotation entered by a reader through an input mechanism at a reading device. The annotation can be linked to a section of the e-book, which can be specified by the reader. The note editor can keep track of the identity of the person creating the annotation.

In one embodiment, an e-book includes a text sub file that can be used to store texts, together with corresponding attributes regarding the texts, such as format and position information of the texts; an illustration sub file that can be used to store illustrations, with position information linking the different illustrations to their corresponding texts, if any, in the text sub file; and a logic sub file including at least one rule to instruct a screen layout module on how sections of the e-book should be displayed on a number of screens of a display. In one embodiment, the text sub file can be embedded in the logic sub file. In another embodiment, the e-book can include an auxiliary sub file with at least an annotation and information regarding the annotation, such as position information as to where the annotation is to be positioned in the e-book. In one approach, the annotation can be a blog. There can be an annotation control mechanism to control if an annotation is to be displayed on a screen.

In one embodiment, an e-book can be provided via a website, which can provide a catalogue of annotations for a reader to search for annotations to be added into the e-book. The searched results, such as the priority of the searched results, can depend on an interest of the reader, such as the content in the e-book that the reader has recently been reading. The reader can decide the position in the e-book where an annotation should be linked.

In one embodiment, an annotation can be an audio file. In another embodiment, an illustration can be an audio file. The audio file can be linked to a section of an e-book. The playing of the audio file can be automated, or controlled by a reader.

One embodiment of a reading device includes a reader monitor that can monitor a reader, such as the reader's reading behavior. An auxiliary sub file in an e-book can record at least one feature monitored by the reader monitor. Examples of information being recorded can include the reader's inputs in controlling page movements; the frequency the reader visited a section or a page of the e-book; the duration of time the reader spent at a section or a page of the e-book; the reader's annotation, with a corresponding position of the annotation in the e-book; a page dog-eared by the reader, which, if activated, can bring the page onto the screen; a section dog-eared by the reader, which, if activated, can highlight the section on the screen; and/or the reader's image, which can be recorded, and which can be linked with the corresponding page or section of the e-book when the image was taken.

In one embodiment, a screen layout module includes a screen layout engine to assemble contents in a screen, and a screen rendering engine to digitize the assembled contents. The screen layout engine can receive information from an illustration descriptor in an illustration sub file, and information from a text sub file to assemble the contents in the screen. The screen rendering engine can digitize text from the text sub file and illustrations from the illustration sub file for display. In one embodiment, the screen rendering engine can also scale an illustration in view of available space in a screen. As to the timing of the layout process, the screen layout module can assemble the contents in a screen for a later part of the e-book as the reader is reading an earlier part of the e-book. In another embodiment, the e-book can be from a web site, and the web site can assemble at least a portion of the contents in the e-book to be displayed, and transmit the assembled contents to the reading device as the e-book is downloaded from the web site.

In one embodiment, to layout contents for a page with text, a screen layout module can first determine the size of a screen of the display and can retrieve a predetermined font size for the text. Then, the module can retrieve at least a section of the page to be displayed, and calculate the logical position of the section in the screen. Based on the calculation, the module can determine if the current screen has sufficient space to display the section. If there is sufficient space, the module can display the section of text. If there is insufficient space, the module can move the section to the next screen.

In one embodiment, a text sub file includes both information to specify the layout of the text and the corresponding illustrations. To layout such a page, a screen layout module can retrieve such information from the text sub file to perform the assembling. In another embodiment, an illustration sub file includes both information to specify the layout of illustrations and the corresponding text. To layout such a page, a screen layout module can retrieve such information from the illustration sub file to perform the assembling.

In one embodiment, a page includes both text and illustration. As the reader is reading the text, a symbol can alert the reader of a corresponding illustration. If the reader selects or activates the symbol, the illustration can be displayed. In another embodiment, as the reader is reading or watching an illustration, a symbol can alert the reader of a piece of text. If the reader selects the symbol, the text can be displayed.

In one embodiment, a first part of the screen can be reserved for text, and a second part of the screen can be reserved for illustration. If a page has both text and illustration, the text can be displayed at the first part of the screen and the illustration at the second part. In one embodiment, if the illustration is larger (e.g. has more bits) than the available space in the second part, a screen layout module can scale the illustration to fit into the second part of the screen. In one embodiment, if the scaling exceeds a predetermined percentage, the screen layout module can move the illustration with the corresponding text, if any, to the next screen.

In another embodiment, a screen layout module layouts contents in a screen for a page with text and illustration. First the module can determine the size of the screen, and reserve a first portion of the screen for text, and a second portion for illustration. Then the module can retrieve a preset font size for the text. The module can retrieve at least a section of the page to be displayed, and calculate the logical position of the section in the screen. Based on the calculation, the module can determine if the first section of the screen has sufficient space to display the section. If there is insufficient space, the module can move the piece of text with all subsequent sections of the page to the next screen. If there is sufficient space, the module determines if there is a corresponding illustration linked to the text. If there is not, the text would be displayed. If there is, the module can then retrieve at least one attribute regarding the corresponding illustration to be displayed, and calculate at least one logical position for the illustration. Based on the calculation, the module can determine if the second section of the screen has sufficient space to display the illustration. If there is sufficient space, the module can retrieve the illustration and display both the illustration with the corresponding piece of text on the screen. If there is insufficient space, the module can move the piece of text with the corresponding illustration to the next screen.

In one embodiment, to display an annotation for a section, a screen layout module can search for the annotation corresponding to the section among a number of annotations in an auxiliary sub file. If such an annotation exists, the annotation is identified, and the module can retrieve the annotation to be displayed with the corresponding section. In another embodiment, the screen layout module again can determine if there is sufficient space in the current screen to display the annotation. If not, the annotation with the corresponding section can be moved to the next screen.

In one embodiment, a reader analyzer can analyze information captured by a reader monitor to determine at least one attribute of the reader. The reader analyzer can determine, for example, a reading pace of the reader in reading an e-book; the reader's degree of interest in at least a section of the e-book (which can be determined based on, for example, a reading behavior of the reader or whether the reader is in front of the reading device); the reader's concentration level in an area of the e-book; and the reader's understanding level in an area of the e-book (which can be based on a response by the reader to a question from the device). In determining an attribute, in one approach, the analyzer can compare an attribute of the reader to an average measurement of the attribute of a number of other readers. In another approach, in determining an attribute, the analyzer can identify the subject matter of the area the reader is reading.

In one embodiment, a reader responder can respond to the reader based on at least one attribute of the reader. The responder can ask the reader if the reader wants additional materials related to an area of the e-book. The additional materials can previously be locked in the reading device, and can be unlocked to allow the reader to read. In one embodiment, the reader needs to be a member of an e-book club to read the additional materials. In one approach, the responder can present a catalogue of titles to the reader to select. Upon selection, the responder can retrieve the additional materials under the selected title from such as a web site for the reader. In one embodiment, the additional materials can be in a memory device of another person, and the reading device can wirelessly and/or via wire to access the memory device. In different embodiments, the responder can provide reviews regarding certain materials in an e-book for the reader (the reviews can be related to but different from the certain materials); reward the reader when the reader reaches a pre-determined milestone (the reward can be tailored to an interest of the reader); restrict the reader from an activity under a pre-determined condition; and/or guide to the reader a product or a service the reader is interested in.

In one embodiment, to read an e-book, the reader needs to enter an appropriate identification into the e-book, and a different e-book can require a different identification.

In one embodiment, different components or functionalities of a reading device to read an e-book can be in the e-book. For example, at least a portion of a reader analyzer is in the e-book. In another example, at least a portion of a reader analyzer and at least a portion of a reader responder can be in an e-book; such as the portion of the analyzer in the e-book categorizes the reader into one of many categories, and in view of the categorizing, the portion of the responder in the e-book retrieves at least a different section of the e-book to be presented to the reader. In another example, the responder retrieves the meaning of at least one word from a dictionary based on the categorizing, and the dictionary can be in the e-book. For example, readers belonging to a first age group get an image as the meaning for the at least one word, and readers belonging to a second age group gets a piece of text as the meaning of the at least one word. In one embodiment, the portion of the reader analyzer and the portion of the reader responder in an e-book can be downloaded from the e-book into a reading device to be used by the reading device. In one embodiment, at least a portion of a screen layout module is in an e-book. In one embodiment, a functionality to read a section of an e-book can be downloaded from the e-book into a reading device when a reader is reading the e-book, but before the reader reaches the section.

One embodiment includes an e-book for a reader with a text sub file and a logic sub file. The text sub file can be configured to store at least one piece of text, together with at least an attribute regarding the at least one piece of text. The logic sub file can be configured to include a set of instructions to instruct an e-book reading device on a functionality regarding reading the e-book at the device. The functionality can include analyzing an attribute of the reader regarding reading the e-book, and providing a response to the reader via the device in view of the attribute analyzed. In one embodiment, the e-book further includes an illustration sub file to store at least an illustration, together with at least an attribute regarding the illustration. Either the text sub file or the illustration sub file can include a piece of position information linking the illustration to an area at the at least one piece of text in the text sub file.

In one embodiment, an e-book reading device includes a speaker, and the e-book can be read to a reader via the speaker. In one approach, page numbers can be read by the speaker as the speaker is reading the e-book.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

FIG. 2 shows one embodiment according to the invention of a screen with text, animation and annotations.

FIG. 3 shows one embodiment according to the invention of a screen with text and animation, with annotations from a club.

FIGS. 8A-C show different embodiments of a text sub file and an illustration sub file according to the invention.

FIG. 11 shows one embodiment of an annotation descriptor based on XML according to the invention.

FIG. 12 shows one embodiment of a collection of annotations based on XML according to the invention.

FIG. 15 shows features in a logic sub file of an e-book according to different embodiments of the invention.

Same numerals in FIGS. 1-16 are assigned to similar elements in all the figures. Embodiments of the invention are discussed below with reference to FIGS. 1-16. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
FIG. 1 shows one embodiment according to the invention of a screen showing text and animation from an e-book.

FIG. 1 shows one embodiment of a screen of a visual output mechanism (like a display) of an e-book reading device. The screen shows an expression from an e-book. In this embodiment, expressions in different forms can be linked together on a number of pages in a user-friendly way. An expression can be a piece of text, an illustration, an audio clip, or others. In one embodiment, an illustration generally describes an expression that can dynamically change when displayed. In one embodiment, an illustration can be an animation or a video. An animation or a video can show, for example, a continuous action, a flow of ideas, an experiment, a reconstruction of history, a visualization of theory, and/or a made-believe moment. In another embodiment, an illustration can be an audio file, such as an mp3 file. In one embodiment, an e-book can be a consolidated set of expressions that can standalone and can be presented without additional expressions for a reader's reading enjoyment.

In one embodiment, a page can have one or more sections. Each section includes an expression. The expression can be, for example, a word, a line of the text, multiple lines of the text, and/or an illustration. As another example, a section can include a piece of text linked to an illustration. In the embodiment shown in FIG. 1, a page has a page number to identify the page, and the page number in FIG. 1 is 35. Such pagination determination can be set, for example, by the author or creator of the e-book. In another example, a publisher of an e-book determines how the e-book should be paginated and the content in each page. Each page can be shown on one or more consecutive screens of a system. Though a page can be shown in multiple screens, the pagination of the page can remain the same. In one embodiment, a screen shows only one page or part of one page, and does not show more than one page simultaneously. The illustration can be shown on a screen, but not part on one screen, and part on another screen, such as the top part of an illustration on one screen, and the bottom half of the illustration on the following screen. Also, in one embodiment, each illustration is shown with (or linked to) its related text or the corresponding section with the text, if any, on the same screen.

In FIG. 1, a piece of text, or a section with the text, is linked to an animation, which is related to and which reinforces the content of the text, or the section with the text. In the figure, one image of the animation is shown. Also, in the figure, a number of words are highlighted, such as Grievous and lightsabers. For additional explanation, these highlighted words can be selected, which would then hypertext-link to other areas. The hypertext linkage of a word can be to a dictionary for the meaning of the word, to an Internet search website for more information about the word, or to other areas.

In one embodiment, as a reader reads an e-book, additional notes or annotations can be presented to the reader regarding the area where the reader is reading. Such notes can help the reader learn about a subject. In one example, these notes are shown alongside their related text and/or illustration. In one embodiment, an e-book can be referred to as the e-book originally published by a publisher, which, in one approach, can be the author or creator of the e-book; and an expression subsequently added to the e-book can be referred to as an annotation of the e-book. In another embodiment, an annotation can be an expression added to an e-book, can be in the e-book's 1st or original publication, and the e-book can standalone without the annotation for a reader's reading enjoyment. In yet another embodiment, the expressions in an e-book can be written or created by one or more than one person, while the annotation can be generated by a separate person.

FIG. 2 shows one embodiment of a screen with text, animation (with just one picture of the animation shown in the figure) and annotations for an e-book. In one approach, the text and animation can be from the e-book originally published by a publisher of the e-book for a reader to read. The annotations can be from another reader (or another person affiliated to the e-book) of the e-book, such as a Star War fan in this example. A piece of note can be more widely accepted/read if it is from a respected person in the field, such as a classroom teacher teaching the corresponding subject, a good critic in the field or a recognized author. These people are typically perceived to be more credible or knowledgeable particularly in the area indicated in the note. In FIG. 2, one such person can be Old-Grievous. In one embodiment, a piece of text with a related annotation can be highlighted, and selecting the highlighted piece of text leads to the display of the related annotation. For example, the piece of text can be hypertext linked to an annotation of a person. By selecting the piece of hypertext-linked text, the annotation can show up on the screen to be read.

In another embodiment, the reader can also write notes or annotate, which can create a more interactive way of reading. Many readers enjoy sharing their reading experiences and/or insights. Expressing their opinion not only can enhance their joy of reading, but can also reinforce their understanding of the material. Exchanging such notes or ideas often goes beyond reinforcing understanding in the reading materials. Such active exchange of information can create a more permanent imprint of the read materials.

FIG. 3 shows an embodiment where the notes can be from a fan club. As a reader is reading an e-book, notes from a club (which can be at a website) can also be included into the e-book for the reader to read. In the example shown in FIG. 3, the fan club is the Grievous Fan Club.

Figure 4:
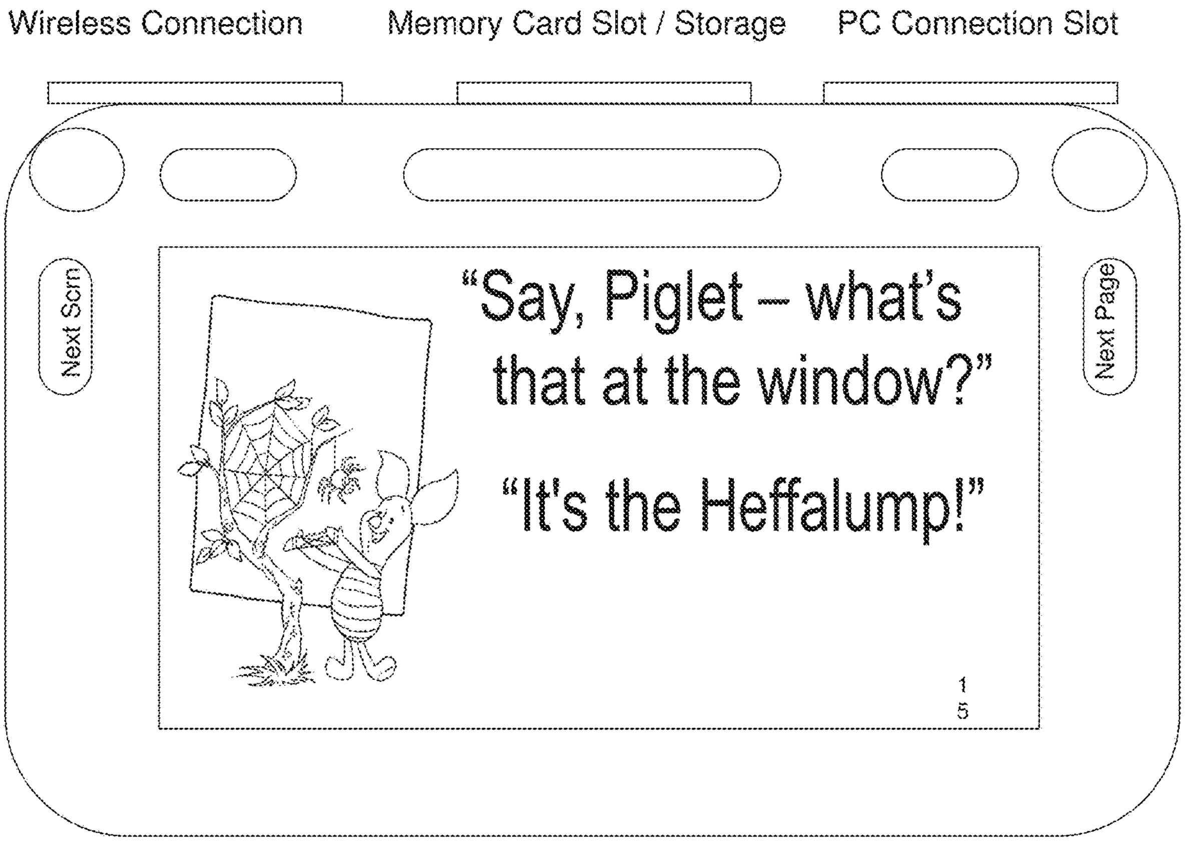
FIG. 4 shows one embodiment of a reading device according to the invention.

FIG. 4 shows an embodiment of a reading device or system. In this embodiment, the system can be a portable handheld device with a LCD display. The device includes a wireless connection port configured to accept different wireless connection modules for different wireless connection formats, such as WiFi, WiMax and cellular connection. The device also can include, among other features, a memory card slot, and a PC connection slot. The memory card slot is configured to accept, for example, different memory cards, a USB drive, or a detachable storage medium. The PC connection slot is configured, for example, to connect the device to another computing device. A page can be shown on the display of the reading device on FIG. 4. In another embodiment, different wireless connection mechanisms or modules are included in the reading device.

In the embodiment shown on FIG. 4, the device also includes a next page and a next screen button, which can be software buttons or physical buttons on the device. The next-page button allows a reader to read the next page, while the next-screen button allows the reader to flip to the next screen, which can be the same page.

Another embodiment allows reading an e-book via a device similar to a cellular phone. The phone can have a screen that is about 2 inches wide and 3.5 inches tall, such as having the size of a smart phone screen. In another example, an embodiment has a screen about the size of a paper-back novel. In yet another embodiment, its screen can be about 8.5 inches by 11 inches.

In one embodiment, to provide inputs to the device, the device includes an input mechanism, such as a keypad, a writing pad, or keyboard, which can be a physical or a software version. The inputs provided can be information, such as annotations by a reader. Another embodiment includes a touch sensitive screen, which can be a resistive touch screen. In another example, the touch sensitive screen is a capacitive touch screen, which can be more applicable to finger than to stylus manipulation. In one approach, the touch sensitive screen can be an overlay over a LCD display.

In one embodiment, an illustration can start if a reader activates/clicks it on the screen. The illustration can be paused by the reader, such as the reader pushing a pause button, which is not shown on the device in FIG. 4.

One embodiment allows a reader to open a window at, for example, the bottom of the screen, to provide inputs, such as notes, into the device. Notes can be entered via a keyboard or a pen stylus directly into the window. In one approach, the device can include character recognition software to interpret the inputs. Yet another approach includes prediction software to predict what the reader is writing based on what the reader has entered. Such character recognition and prediction software should be known to those skilled in the art and would not be further described in this application.

Another embodiment includes more than one display in the reading device. In the case of a dual-display version, the two displays can be positioned side by side. In one embodiment, one display can be based on e ink technology, while the other can be a LCD display. The e ink display can be used to display text, while the LCD display can be used to display illustration, such as video. In another embodiment, one display can be for reading, while the other can be for entering annotation.

Figure 5:
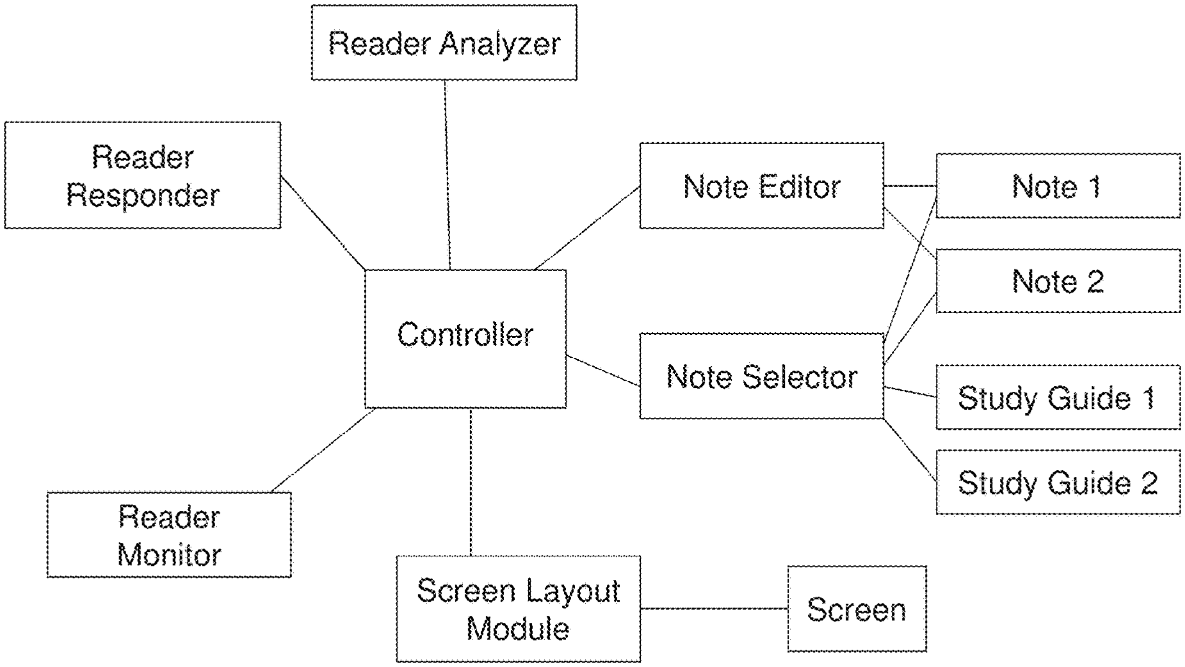
FIG. 5 shows one embodiment with a number of components in a reading device according to the invention.

FIG. 5 shows one embodiment of a reading device with a number of components. The device can include one or more of the following components coupled together: a controller (such as a processor), a screen layout module, a display configured to show a number of screens, a note selector, a note editor, a reader monitor, a reader analyzer and a reader responder. In one embodiment, the screen layout module is configured to control the layout of the content of an e-book (or a section of an e-book) in each screen. In another embodiment, the note selector is configured to retrieve or select an annotation with a position in the e-book. As an example, in FIG. 5, the note selector has retrieved study guide 1, study guide 2, note 1 and note 2 for a reader. After the notes have been retrieved, the screen layout module can be configured to assemble the notes into the corresponding positions in the e-book for display on a screen. In another embodiment, the reader monitor can be configured to monitor the reader, such as the reader's reading behavior; and the reader analyzer is configured to analyze, for example, the interest and/or progress of the reader based on information regarding the reader, such as the information captured by the reader monitor. Then based on the results from the analyzer, the reader responder can be configured to respond accordingly. For example, the reader responder can instruct the note selector to select a piece of note for the reader based on the analyzer-identified reader's interest. In one embodiment, the reader responder can be configured to respond to the reader based on the reader's inputs, as indicated by the reader monitor. For example, a reader requests connection to the Internet at the e-book reading device, and the responder can connect the e-book to the Internet to allow reader access.

In another embodiment, the reading device includes a note editor, which can be configured to assemble an annotation entered through an input mechanism. For example, a reader enters a piece of note. The reader monitor can capture the piece of note entered together with the section where the note is entered or where the note is designated to be linked. For example, the reader can designate the position where the note should be linked to. Then the note editor can link the piece of note to the corresponding area or section in the e-book, and can have the piece of note stored with the corresponding pagination, area and/or section information. The note editor can also add a symbol or bookmark, such as a carrot, at the area or section in the e-book. Or, the editor can highlight one or more words in a piece of text, or an area in an illustration, where there is an annotation. Subsequently, one way to bring up the annotation can be by selecting the bookmark or the highlighted area. In another embodiment, the note editor also keeps track of the identity of the author or creator of the piece of note, and links the identity to the piece of note.

Figure 6:
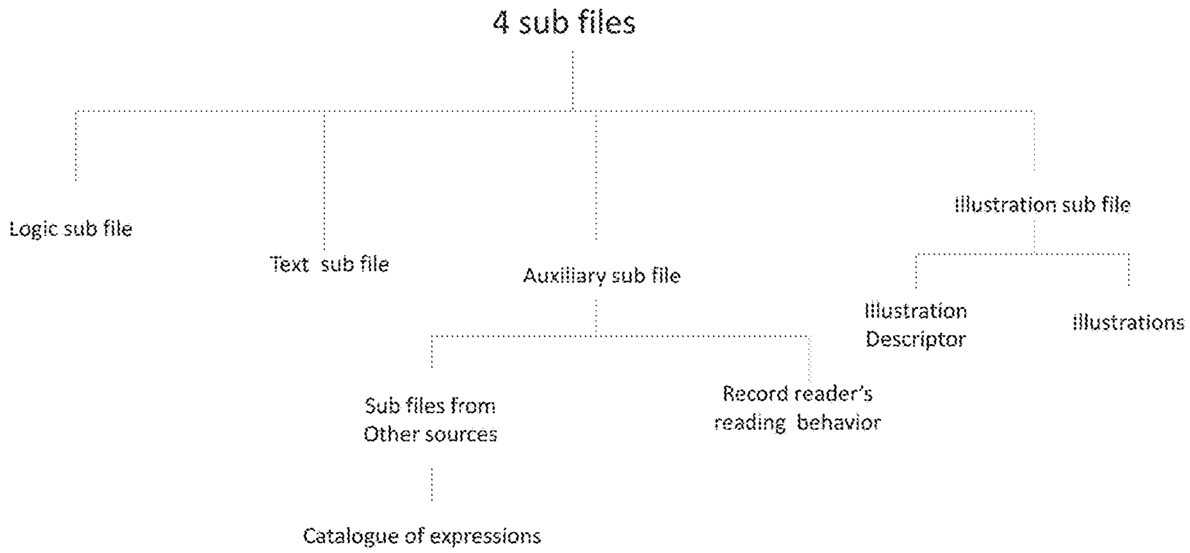
FIG. 6 shows one embodiment according to the invention of a number of sub files of an e-book.

FIG. 6 shows one embodiment using a number of sub files, for example, to hold different files/aspects of an e-book (or a portion of an e-book). In one implementation, there are 3 sub files, including a text sub file, an illustration sub file, and a logic sub file. The text sub file can be configured to hold the text portion of an e-book, together with at least one attribute regarding the text, such as the format and position information of words in the text. In one example, the text sub file can be based on HTML and/or XML format, or other text marked-up format. The illustration sub file can be configured to hold the illustration portion of the e-book. In one embodiment, the illustration sub file includes an illustration descriptor and the illustrations. An illustration descriptor includes at least one attribute regarding an illustration, such as information linking the illustration to its corresponding texts or section of text, if any, in the text sub file. The logic sub file can be configured, for example, to include the logic (or at least one rule) to instruct a screen layout module on how, for example, a piece of note, illustration, text, paragraph, section or page of the e-book should be displayed on a screen. The logic sub file can be based on scripting language in HTML and/or XML format, such as Javascript, Actionscript, Silverlight script, and HTML script. In one implementation, a text sub file is embedded in a logic sub file.

One embodiment further includes an auxiliary sub file for the e-book. In one approach, the auxiliary sub file includes an annotation, such as introduced from other sources, for a reader, and the appropriate pagination, section and/or position information, where the annotation should be positioned in an e-book. Then, for example, a screen layout module can add the annotation into the appropriate page, area and/or section of the corresponding text in a text sub file and/or the corresponding illustration in an illustration sub file of the e-book. In one embodiment, when a publisher publishes an e-book, the e-book does not have to include the annotation.

For example, the annotation can be one or more text sub files and/or illustration sub files from other sources, such as other e-books. As another example, if the annotation is a blog, to locate correctly, the blog includes position information to identify the position(s) of the corresponding page/section of the e-book where the blog or different parts of the blog would be linked.

In one embodiment, an annotation introduced does not have to be displayed. For example, the logic sub file includes control mechanisms to activate viewing of the annotation. In one approach, annotations are at a number of positions in the e-book, and the activation mechanisms can be at each of the positions, such as at the corresponding page/section. If activated at a certain page/section, the corresponding annotation can be displayed for that certain page/section of the e-book. In another embodiment, the activation mechanism is global for the e-book. If activated, annotations can be displayed whenever they occur across the e-book. In yet another embodiment, activation can be based on certain characteristics, such as all annotations by a certain person, but not another person, would be activated or automatically displayed at their corresponding positions.

In one embodiment, a reader can be provided with a catalogue of annotations. The annotations can be grouped together based on different rules. For example, the annotations can be grouped together according to their authors or creators. In another example, the annotations can be grouped together according to their subject matter. In yet another example, the catalogue can be provided to the reader by, for example, a web site that provides the e-book. The catalogue can include texts, illustrations or other expressions for the reader. The reader can electronically search the catalogue and select the expressions that the reader wants. Such selected expressions can then be incorporated or added to the e-book as annotations or additional materials for the reader. The incorporation can be through adding the expressions into the e-book's auxiliary sub file. As the reader reads the e-book, the added expressions can be brought in at the specific pages/sections as specified by, for example, pagination/position information in the added expressions. In another approach, the reader can decide which section(s) in the e-book one or more added expressions should be linked to.

In one embodiment, after the reader has accessed an e-book, the reader can, at a later time, ask for additional expressions/annotations. In one embodiment, the reader can ask for a catalogue of annotations (or additional materials), and then electronically search for the annotations to be added into the e-book. One way is to go to the same source, such as an e-book club or a web site, that provides the e-book for such annotations.

In one approach, searched results for the annotations can be based on contexts of the e-book. For example, if the approximate position where the reader most recently is reading at the e-book is known, searched results can depend on the content/context at that position. The content/context can help narrow the searched results and can provide more relevant search results for the reader. For example, more relevant searched results can be ranked higher and listed earlier for the reader to select.

In one embodiment, an annotation can be an audio file. For example, when a page is read, an audio file (e.g. an mp3 annotation) is played. In one approach, the playing of the audio file can be automated. As the reader moves to a certain page, or a certain section, an audio file can be automatically played. In another approach, a reader is alerted to an audio file next to a section of an e-book. The reader can open or activate the audio file and listen to it as the reader is reading the e-book.

Figure 7:
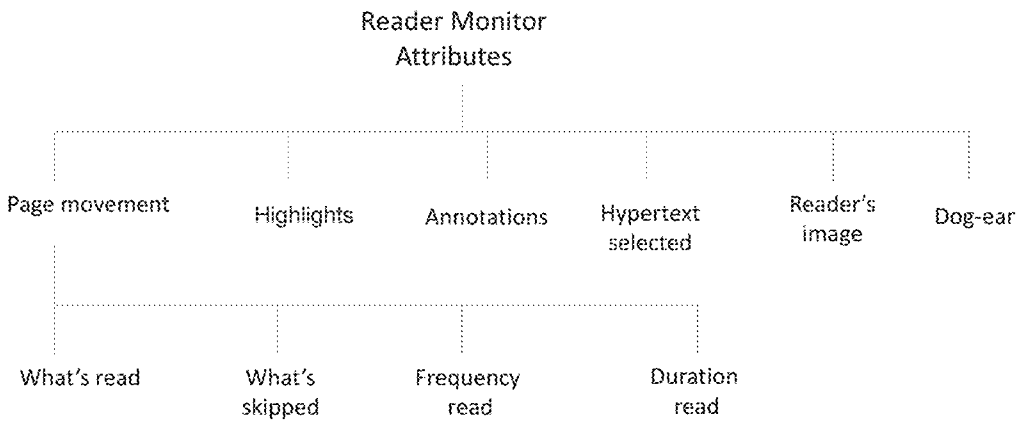
FIG. 7 shows a number of attributes regarding a reader monitor according to different embodiments of the invention.

FIG. 7 shows different embodiments regarding attributes of a reader monitor, which can be used to monitor a reader's reading behavior. In one embodiment, the monitored information or attributes can be recorded in an auxiliary sub file. The reader monitor can monitor, for example, the reader's inputs in controlling page movements, such as which page/section the reader has moved by (or read) and the pace (such as pages/sections per minute); which page/section the reader has skipped (or moved by quickly relative to the reader's typically reading pace in reading the e-book, such as at more than 3 times of the typical pace); the frequency the reader has visited a section/page; the frequency the reader has watched an illustration; the frequency of a certain section of an illustration the reader has watched; the duration of time the reader has spent reading and/or watching a section/page; the number of times the reader has gone back to a section/page; and/or the number of times an animation has been replayed.

Another type of reading behavior can include a reader's annotation entered via, for example, an input mechanism at a reading device. An annotation can be an expression, such as a piece of text entered by the reader; a picture, which can be from another source; or an illustration, which again can be created or retrieved from another source. An annotation can also be a consolidation of different sets or types of expressions, such as texts and pictures from multiple e-books, sections in multiple e-books, blogs, newspapers and/or magazines. An auxiliary sub file can keep track of the corresponding section/page of the e-book where the reader's annotation is related to or is entered at. The tracking or position identification can be through bookmarking or by a symbol. For example, the reader can identify an area on a page and start annotating. The added notes can be bookmarked to the area, or denoted by a symbol at that area. Subsequently, clicking the bookmark or the symbol would bring up the added notes, which can include the materials introduced by the reader. In one approach, the added notes can be shown inside a window or a bubble, with a pointer pointing at the corresponding section or area of the e-book.

In one embodiment, another type of reading behavior monitored by a reader monitor can include recording one or more pages (or sections) dog-eared by a reader, such as by having a tab shown on a side of a page. The position of the tab relative to its corresponding page can be changed. One approach includes a tab function, which can be a software or hardware switch. If the tab function is activated, the one or more tabs can be shown on the screen, such as a list of tabs shown on the right side (or another side, like the left side) of a page, or a visual representation of multiple pages. In one example, a page is selected and is shown on a screen if its corresponding tab is activated, such as clicked or selected.

In one embodiment, a tab not only can identify a page, but the tab can also identify a specific portion of the page, such as a section. For example, the tab can identify, such as, a specific paragraph, or an illustration in the e-book. When the tab is selected, the corresponding section can be identified and highlighted. For example, when the tab is selected, the corresponding section can be brought to the center of the screen.

Yet another type of reader's behavior can include the reader's images. In one embodiment, a reading device includes a camera (which can be considered as an input mechanism) that can be used by a reader monitor to capture the reader's images as the reader is reading. The images can include facial images. For example, when the camera takes a picture and the reader is not in front of the camera, the picture would not include the reader. Then the picture can be processed through, for example, pattern recognition techniques known to those skilled in the art to indicate that the reader is not (or is) in front of the device. Additional information can also be recorded. For example, page/section information can be recorded to indicate the associated page/section when a picture was taken.

Time information can be also recorded. For example, the time when an image is taken can be recorded. Such information can be linked with the associated page/section. In another example, the duration of time when a screen has been shown before another screen is displayed, can also be recorded.

A number of sub files of an e-book have been described. There are different ways to implement the different sub files. FIG. 8A shows an embodiment of a text sub file. This embodiment shows certain text in a page with page number 35. The text also shows, for example, the position and identification (ani-4) of an illustration with the name of Grievous. FIG. 8B shows an embodiment of an illustration descriptor of an illustration sub file. The illustration descriptor describes attributes of an illustration named ani-4, including the type of the illustration being an animation; the dimensions of the animation; and the link "grevious.swf" for the animation. This link can be a link to the Internet. The different embodiments can be based on HTML and/or XML.

Figure 8C:
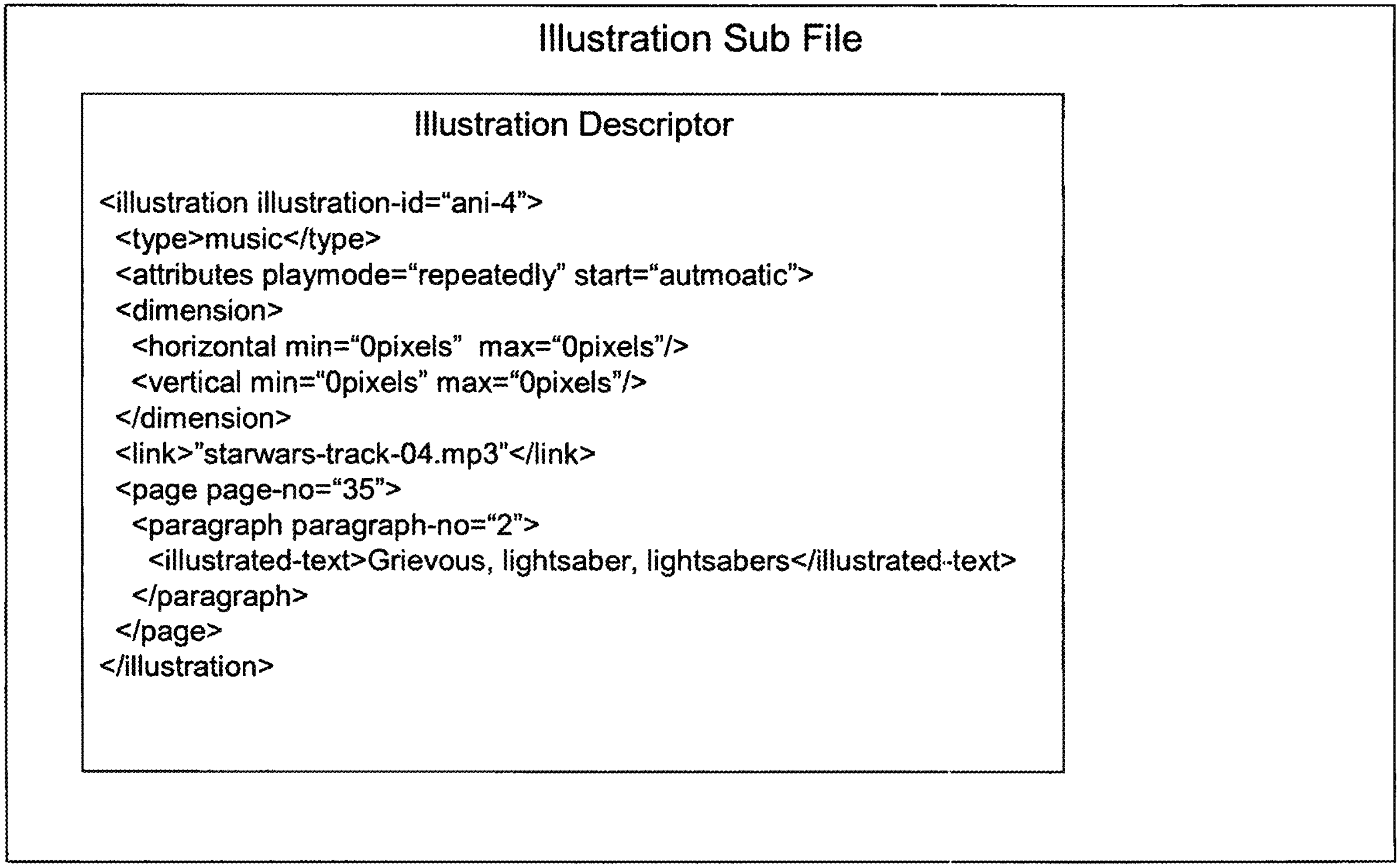

In one embodiment, an illustration can be an audio file. FIG. 8C shows an illustration descriptor that can be used for an audio file. In this example, the link of "starwars-track-04.mp3" shows an mp3 audio file. The attributes indicate that the audio file can play automatically when its corresponding screen or section is displayed or rendered, with the music file repeating until a user selects another screen or section. In another example, a music file can be linked to a piece of text (or an icon or symbol) and when a reader selects or activates the piece of text (or the symbol), the music can be played. In the example shown in FIG. 8C, the dimension is set to be 0 pixel horizontally and vertically, indicating the illustration does not take up any display area of the screen. In another example, an audio illustration can include a picture, which occupies some display area. There can be one or more other attributes for audio files, such as, an audio illustration including a playlist of music files; the corresponding illustration descriptor including the duration or the length of time of different pieces of music; and the corresponding illustration descriptor including a preset volume or other acoustic effects regarding the music. In one embodiment, a reading device provides physical or logical switches or control mechanisms to allow a reader to control such acoustic effects.

In one embodiment, a note editor can be configured to generate a text sub file and/or an illustration sub file based on the annotations entered and/or retrieved by a reader. For example, a reader enters a piece of text and retrieves a video as notes for a section in an e-book. The note editor can create a text sub file to store the text entered. The note editor can also create an illustration sub file with an illustration descriptor to denote attributes of the video, and with an illustration, which includes the content of the video.

In one embodiment, a screen layout module can be configured to layout the contents in one or more pages of an e-book (or one or more sections of an e-book), which can have different types of contents, for each screen. As an example, a page can have, for example, sections of text, each with its related illustration, with the first animation at the end of first paragraph, and the first video at the end of the third sentence of the third paragraph in the page. Then the screen layout module can assemble the contents so that the first animation, the first video together with the text from the first paragraph up to the end of the third sentence of the third paragraph are all displayed on the same screen.

In one embodiment, a screen layout module includes a screen layout engine and a screen rendering engine. For example, the screen layout engine can be configured to assemble contents in each screen. The screen layout engine can receive information from an illustration descriptor in an illustration sub file, and information from a text sub file. Information from the illustration descriptor can provide different layout attributes regarding a corresponding illustration (such as the dimensions of an animation). Information from the text sub file can provide text and layout attributes regarding the text (such as font size of the text and the positions of different sections of the text). Based on such layout information, in one embodiment, the screen layout engine can link the different sections of text to their corresponding illustrations. For example, the engine can link a section of text with its related illustration to be displayed in the same screen. The consolidated layout information for text and illustration can then be fed into the screen rendering engine. In one embodiment, based on the fed information, the screen rendering engine can retrieve, for example, text from the text sub file and illustrations from the illustration sub file, and digitize the appropriately-assembled text and illustrations for display in the screen.

In one approach, to render an illustration, a screen layout module retrieves, for example, attributes, such as format and position information, of the illustration from an illustration descriptor. The attributes can include a file name and a file type. In FIG. 8*b*, the illustration descriptor includes the filename "grevious.swf", which indicates the location of the illustration as the file named grevious.swf. The filename also indicates a file type "swf", typically denoting an Adobe Flash file. Then the screen layout module can run Adobe Flash Player for the illustration. In this example, the illustration descriptor may include attributes for the Adobe Flash Player software, such as allowing for fullscreen, allowing to pause, and others. The screen layout module can invoke a Flash player module, and pass the filename "grevious.swf" to the Flash player module.

In one embodiment, a screen rendering engine can perform the function of scaling. For example, an illustration is a picture with a resolution of 400×400 pixels. The screen layout module sets the dimension for the illustration to be a square of 100×100 pixels. This can be due to space in the screen. Then the screen rendering engine can scale the picture to fit into the 100×100 pixel square area.

Figure 9:
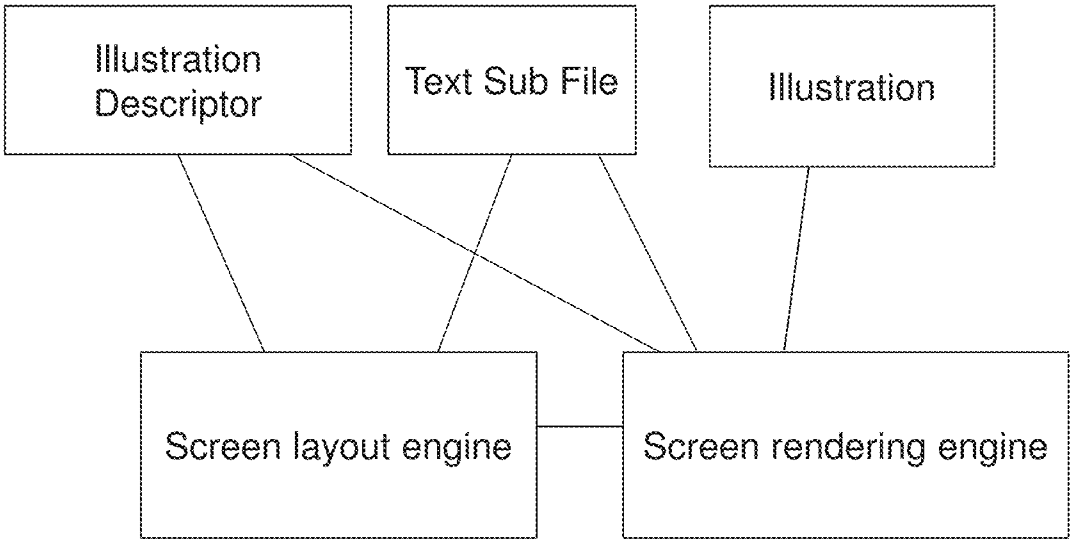
FIG. 9 shows one embodiment according to the invention of a screen layout module with different inputs.

FIG. 9 shows one embodiment where information from an illustration descriptor is also fed into a screen rendering engine. In another embodiment, such information is fed into a screen layout engine, but not directly into the screen rendering engine.

The screen layout process can be implemented at different times. In one embodiment, when a reader gets an e-book for a reading device, the site (which can be a web site) providing the e-book can access the reading device to find out attributes regarding the reading device, such as its screen size. Based on such information, the site can perform the calculation for the screen layout of the e-book, or can perform the calculation for the screen layout of at least a portion of the e-book. For example, the site can assemble at least a portion of the contents in the e-book to be displayed in the reading device, and transmit such assembled information to the reading device. In another embodiment, as a reader is reading an earlier part of the e-book, the screen layout of a later part of the e-book is assembled. The calculation can be performed one portion at a time. For example, as the reader starts reading one chapter, the layout for the next chapter is calculated. In another example, while the reader is reading one page, the layout for the next one or more pages is calculated, or their contents are assembled. In another approach, such calculation can be performed by the reading device.

There can be different approaches to implement a screen layout module to layout contents in a page of an e-book for a reading device. In one embodiment to layout the page that includes only text, first the module determines the size of the screen of a display of the corresponding reading device, such as 800*600 for landscape; and 600*800 for portrait. In one example, a screen can be separated into sub screens, such as a sub screen of 800*600 and another of 800*120. Then the module assumes the font size for text, such as 14 points. Both the screen size and font sizes can be configured to other values. The text in the page to be displayed is retrieved, which can be done a section at a time. The screen layout module can retrieve such information from the text sub file of the e-book. In another approach, other attributes regarding the text or a section of the text, such as location information, are also retrieved, such as from the text sub file. And the module can calculate the logical position of the section, and determine if the current screen has sufficient space to display the section. If the calculated logical position of the section can be displayed within the current screen, the module would set to display the section of text within the screen. If not, the section would be moved to the next screen.

In another embodiment, the page only includes an illustration, which can be an animation. The screen layout module can retrieve, for example, location information of the illustration from an illustration descriptor in an illustration sub file of the e-book. There can be multiple sections in the page with illustrations, and an illustration can have an illustration id (e.g. "ani-4" in the example shown in FIG. 8*b*). The module can calculate the logical position of the illustration (e.g. for the animation "ani-4" in the example shown in FIG. 8*b*). If the calculated logical positions can be within the current screen, the module would set to display the illustration within the screen.

In one embodiment, a page includes both text and illustration. In this example, a text sub file includes information to specify the layout of the illustration. In another example, an illustration sub file includes information to specify the layout of the text, and such information can be in an illustration descriptor in the illustration sub file.

In yet another embodiment, whether an illustration is displayed is determined by the reader. There can be a symbol or icon indicating the presence of an illustration at a certain area or section on a page. If the reader clicks the symbol or icon, the corresponding illustration would be displayed, which can be in a pop-up manner. Similarly, if the reader is watching illustrations, in one embodiment, there can be a symbol or icon indicating the presence of text. If the reader clicks the symbol or icon, the corresponding text would be displayed.

In one embodiment, there can be multiple sections in a page, with some having text and illustrations and some without illustrations. One approach to layout a screen in such the page is to fix the positions of the text or illustrations in the screen. The following serves as an example where the positions of illustrations are fixed. The screen layout module pre-determines the positions of illustrations in the layout of the screen. The module can reserve a side bar, such as an area (e.g. 25% of the screen size) on the left side or the right side of the screen, for illustrations, when the screen is in landscape mode. Or, when the screen is in portrait mode, the module can reserve an area (e.g. 20% of the screen size) on the bottom of the screen for illustrations. In another approach, the module can reserve a number of boxes, such as square boxes of various sizes, on the screen for illustrations. Then, in determining if an illustration can be shown, the module can retrieve the illustration's dimensions from an illustration descriptor, and calculate the remaining available space in the illustration boxes/areas to see if the illustration can fit. In one approach, the module can adjust the size of the illustration for fitting. For example, if the available/remaining space is 100 by 100 pixels and the illustration is 120 by 120 pixels, the module can reduce the size of the illustration by about 50% to fit the illustration into the available area. In one embodiment, the module is allowed to scale the illustration by not more than a pre-determined percentage. If fitting requires more than the percentage, the illustration with the corresponding text, if any, could be moved to the next screen.

Figure 10:
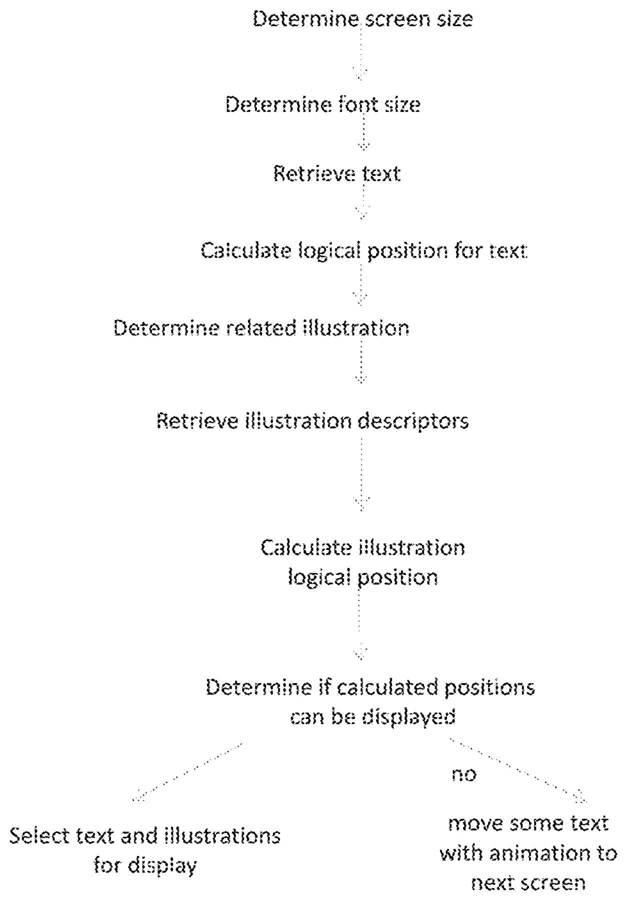
FIG. 10 shows different embodiments of a screen layout module to layout contents in different pages for an e-book according to the invention.

FIG. 10 shows one embodiment to layout contents in a screen for a page that includes text and illustrations. In this example, the screen layout module reserves 40% of the screen size on the bottom of the screen for illustrations. First the module determines the size of the screen and the pre-determined font size for text. Then the module retrieves a piece of text (e.g. for the next section to be displayed) and at least one attribute regarding the text, and calculates the logical positions for the piece of text. If the calculated logical positions of the piece of text are not within the 60% of the current screen (or within the remaining empty portion of the 60% of the screen), the module would move the piece of text, with all subsequent sections of the page, to the next screen (or the module can change the font size of the text, or perform other operations). If the piece of text can be within the 60% of the current screen, the module would determine if there is a corresponding illustration to be displayed with the piece of text. For example, if there is such an illustration, there can be an illustration id linked to the piece of text. If there is no corresponding illustration, the piece of text can be displayed. If there is such an illustration, the module can retrieve at least one attribute regarding the corresponding illustration for display. Such information can be in an illustration descriptor in an illustration sub file. Based on the retrieved information, the module can calculate the logical positions of the illustration to see if the illustration can be within the 40% of the screen (or within the remaining empty portion of the 40% of the screen). If the illustration can be displayed, the module would retrieve the illustration, and display the illustration with the corresponding piece of text in the current screen. If the illustration cannot, the module would move the illustration with the corresponding piece of text to the next screen.

In one embodiment, the content in a page extends beyond one screen. The screen layout module can assemble the content in the page in consecutive screens, but maintain the pagination of the e-book. In other words, the consecutive screens can have the same page number. In one approach, the screen layout module would set to display the text with the corresponding illustration, if any, that can be shown within one screen to be shown in that screen. The areas that extend beyond the screen would be moved to the next screen. The module can redo the calculation for those areas, while maintaining the pagination.

In one embodiment, when the last part of a page is showed on a screen and there is still space in the screen, the screen does not fill the space with the beginning part of the next page. In other words, additional information from the next page is not introduced into the current screen for this embodiment.

In one embodiment, the screen layout module does not provide scrolling function to show only a portion of an illustration. Instead, the module provides a discreet jump function where an entire illustration is moved from one screen to the next screen, without allowing an illustration to be partially shown on a screen.

FIG. 11 shows one embodiment of an annotation descriptor based on XML and can be in an auxiliary sub file. This example shows a text annotation. This example differs from a text sub file with embedded illustration id to show the existence of illustration linked to a piece of text. One reason for the difference is because an annotation can be provided subsequent to the publishing of an e-book. In this example, information in an auxiliary sub file regarding different annotations can determine if there is an annotation linked to a piece of text. This determination can be done, for example, by examining or searching the auxiliary sub file to identify one or more annotations for, such as, a specific section of text or illustration of the e-book. The annotation for a corresponding section can then be identified, and subsequently shown on the screen. Also, for the annotation, its different attributes, such as its dimensions (computed, for example, by font size, text, images, etc.), can be determined. Then the annotation can be appropriately linked and displayed with the appropriate section. In one example, there can be reserved areas on a screen to display the annotation; the annotation can be shown in a pop up window if activated; or other approaches described in the specification can be used. If the current screen does not have enough space to display the annotation, the annotation with the corresponding section can be moved to the next screen.

FIG. 12 shows one embodiment of a collection of annotations based on XML. The collection can serve, for example, as a study guide or an e-book review, and can be in an annotation descriptor. The collection can be from one or more other readers. In the example shown in FIG. 12, the collection of annotations is from one author, Old-Grievous, who is linked to the collection of annotations. In this example, the annotations can serve as a book review for an e-book.

Figure 13:
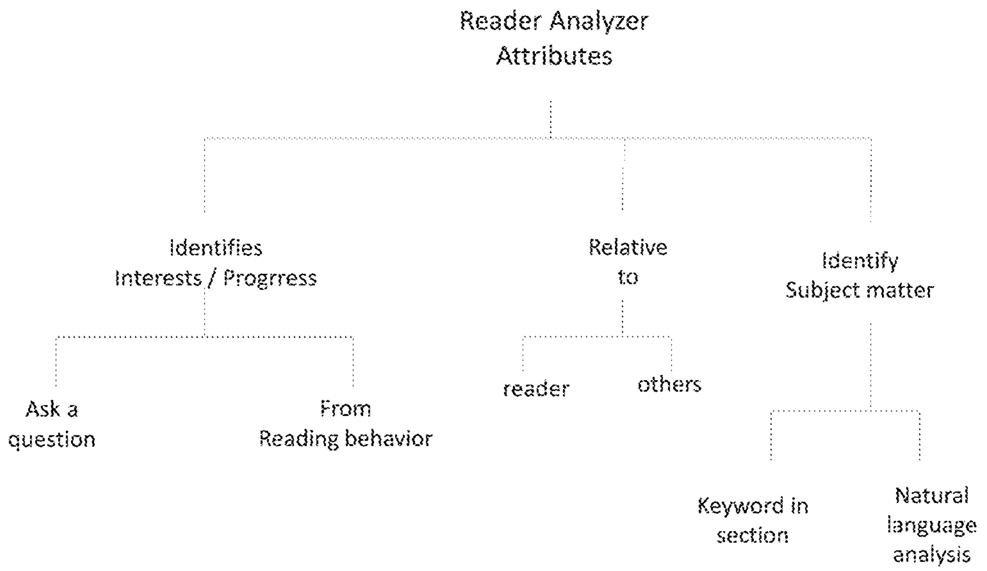
FIG. 13 shows a number attributes regarding a reader analyzer according to different embodiments of the invention.

In one embodiment, a reading device includes a reader analyzer to determine, for example, at least an attribute of a reader. The analyzer can make such determination based on information collected by a reader monitor. The monitor can store the monitored reader's reading behavior in an auxiliary sub file. In a different embodiment, the reader monitor can include a reader analyzer, or some functions of the reader analyzer can be performed by a reader monitor. FIG. 7 shows a number of reading behaviors identified by a reader monitor according to different embodiments. FIG. 13 shows a number of attributes regarding a reader analyzer, which can use information captured by the reader monitor for analysis.

In one embodiment, a reader analyzer analyzes a reading behavior of a reader. For example, the analyzer can determine a typical reading pace of the reader in reading an e-book. This can be done based on averaging the reader's reading speed over a number of pages/chapters of the e-book. In another embodiment, the analyzer can be configured to identify the reader's interest (or degree of interest) and/or progress in an e-book and/or a section of an e-book. This can be based on analyzing a reading behavior of the reader. For example, a section/page that the reader has read more times than other section/page indicates that the reader may be more interested in that section/page. A section/page that the reader has spent a lot of time on may also indicate the reader's higher interest in that section/page. Another reading behavior the analyzer can analyze is based on the reader's highlight and/or the reader's notes. A highlighted section/page is a section/page that the reader is more interested in. A section/page the reader has annotated also can indicate the reader being more interested in that section/page. Another reading behavior an analyzer can analyze is based on whether the reader has clicked on a hypertext-link (or a highlighted area) at a section/page. The reader can be considered more interested in the area the reader has clicked. One embodiment can monitor which highlighted words have been clicked. One approach assumes that the reader is more interested in subject matter(s) under clicked words.

Yet another reading behavior the analyzer can analyze is based on the reader's images. One or more of the monitored behaviors can be combined in the analysis. For example, no or very little page movement for a long duration (which can be relative to the reader's typically reading pace in reading the e-book) conveys very different meanings regarding the reader's interest in that page if the reader is present in front of the reading device, or absent from the reading device. In one approach, in determining a reader's interest level, a reader analyzer determines whether the reader is in front of the reading device.

In one embodiment, a reader analyzer can analyze to determine a reader's concentration level in reading an e-book, or section(s)/page(s) of the e-book, based on the reader's one or more images, and/or the reader's reading behavior, which can depend on information in the one or more images. Different embodiments regarding a reader's concentration level can be found in U.S. Pat. No. 5,944,530, entitled "Learning method and system that consider a student's concentration level," which is hereby incorporated by reference.

In one embodiment, a reader analyzer can also analyze to determine a reader's understanding in an e-book, or section(s)/page(s) of the e-book. One approach to determine a reader's understanding level is again based on analyzing one or more reading behavior of the reader. For example, a page includes highlighted words with hypertext linkages to a dictionary. One embodiment monitors which highlighted words have been or have not been clicked or selected on a page. In one approach, if the reader has selected a specific word to find out its meaning from the dictionary, the reader is considered to have understood the meaning of the word.

In another approach, an e-book is generally suitable for 5th grade reading level, but with certain words at different levels, such as at 6th grade level or higher. Based on the words selected by a reader to check for meaning, in one embodiment, the reader's vocabulary level can be determined.

As another example, an e-book is a user manual, such as of a dishwasher. The manual can highlight terms and/or functions specific for the product/service, which in this case can be a dishwasher. Each highlighted word can be hypertext linked, such as a highlighted function can be hypertext linked to an animated video showing how the function can be used. If a reader has selected that highlighted word and has watched the linked video, the reader is considered to have understood how to operate the function.

As yet another example, an e-book is a textbook, such as a mathematic textbook. Some highlighted words can be mathematical terms and are linked to their corresponding definitions in the e-book. Another term can be further linked to a list of related theorems, lemmas and/or corollaries. If a reader has selected a highlighted mathematical term over a predetermined number of times, such as over 20 times, a reader analyzer will assume that the reader does not understand the term. The analyzer can also keep track of the time when the reader has selected a term and make decisions based on the time/durations/gaps when the reader re-selects a term. For example, if the reader has selected the term "Fibonacci Series" a third time within a predetermined time frame, which is considered short, such as a week, an analyzer can assume that the reader is very interested in the term. In addition to the definition of the term, additional related materials can be presented to the reader, such as an animation generating a golden spiral, or counting spiraling florets of a Sunflower head.

Another approach to determine understanding level depends on having a reader monitor ask a reader a question. This includes sending the reader a quiz or a number of questions. In one example, asking a question can be asking the reader to perform an activity, such as on an illustration. The results can determine the reader's understanding in certain section(s)/page(s) of an e-book. As an example, an annotation of a section/page from another reader is showed to the reader and then the reader monitor asks the reader for agreement or disagreement with the annotation shown. Based on the response, the reader analyzer can have an indication on the reader's understanding level.

In analyzing a reader's behavior to determine, for example, the reader's interest, progress and/or understanding regarding an e-book, or other attributes, a reader analyzer can make the determination relative to the reader's past behavior, or relative to other readers. For example, the reader's typical reading speed is five minutes a page (which can be relative to a specific e-book). If the reader is much slower than this rate (for example, for the same e-book) at a certain page, the reader might be more interested in that page, or might need help in the information in that page. In another embodiment, the analyzer can compare an attribute of the reader with an average measurement of the attribute of many other readers. For example, most readers spend 5 minutes on a page for an e-book, but the current reader has been at that page for a long time (e.g. in front of a camera of the e-book and has not moved from the page for 20 minutes). This may imply that the reader's interest in that page is higher than typical, or the reader may need help in that area.

One embodiment identifies the subject matter of a section/page or an area the reader is reading. Based on the subject matter identified, a reader analyzer can determine an attribute regarding the reader. In one approach, each section/page/illustration can be characterized or represented by one or more key words, which can be meta tags. If a reader is interested or is considered interested in an area, their corresponding key words show the subject matter the reader is interested in. In another approach, the analyzer identifies the subject matter of an area/section of an e-book based on natural-language processing the corresponding section/page. For example, the analyzer identifies the subject matter of the area based on such as the grammars, semantics, keywords, terms, synonyms and/or phrases of the corresponding section/page.

Figure 14:
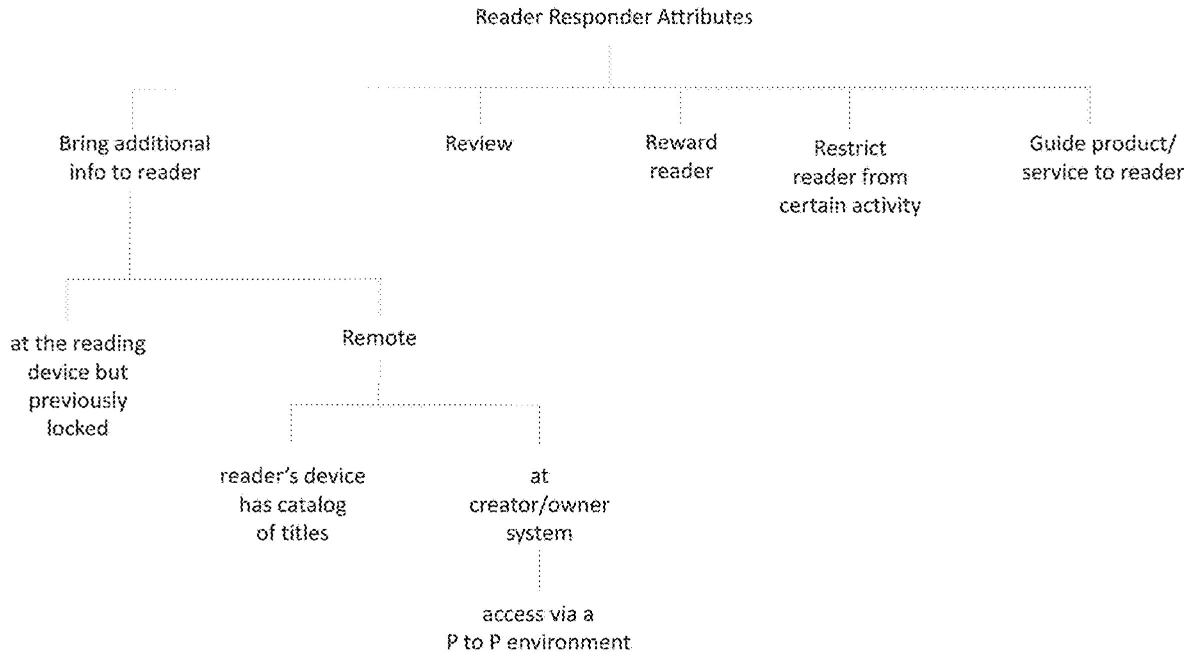
FIG. 14 shows a number of embodiments according to the invention regarding attributes of a reader responder.

In one embodiment, a reader responder can be configured to react or respond to a reader based on at least one attribute of the reader. The attribute can be the reader's interest, progress and/or understanding in section(s) in an e-book, which can be determined by a reader analyzer. In another example, the response can be based on an output from a reader monitor. FIG. 14 shows a number of embodiments regarding attributes of a reader responder.

In one embodiment, a reader responder can ask if the reader wants additional materials related to a section/page or an area of an e-book. This section/page may be what the reader is interested in, where the reader has progressed to, where the reader may need more assistance, and/or for other reasons.

The additional materials can be from different sources. In one embodiment, the additional materials can be in the reading device that the reader is reading from, but may previously be locked from the reader, or previously not presented to the reader. The responder can unlock or present them to the reader to view under certain predetermined condition(s). In one example, the reader may need to pay to unlock or to see the materials. In another example, the reader may have to belong to a certain organization/club, which can be an e-book club, in order to have the privilege to view such additional materials.

In another embodiment, the additional materials are remote from the reading device the reader is using to read. The device can have a catalog of titles/subjects regarding additional materials, but not the corresponding more detailed content. After the reader has identified certain additional materials (such as based on the titles), the device can, wirelessly or by wire, link to an e-book club or a website (or other locations) and retrieve the certain additional materials into the reading device. In one approach, the certain additional materials can be added, such as via overlaying, into an auxiliary sub file of the e-book. In another embodiment, the catalog of titles/subjects can also be at the website (or the other locations), which can be accessible by the reader.

In yet another embodiment, additional information/materials can reside in a memory device or storage medium of the creator/owner of the additional materials. Such materials can be accessed via a peer-to-peer protocol between the reader's reading device and the creator's device, which, in one embodiment, also can be a reading device. In another example, the memory device or storage medium can be wirelessly accessed by the reading device of the reader.

There can be other types of reactions by a responder. In one embodiment, the responder can provide review regarding certain materials in an e-book for the reader. For example, in an area that the reader needs more assistance, a responder can retrieve additional materials to help the reader. The additional materials can be related to, but do not have to be the same as, the certain materials to be reviewed. For example, the certain materials include an animation; to review, a different animation can be played for the reader. Different embodiments regarding review can be found in U.S. Pat. No. 5,863,208, entitled "Learning system and method based on review," which is hereby incorporated by reference.

In one embodiment, a responder can provide rewards for a reader when the reader reaches a pre-determined milestone. For example, the reader has finished reading 50% of the e-book. The responder can ask if the reader would like to have a reward. In another approach, a reader gets a reward based on the reader's understanding in the materials read. For example, a monitor can quiz the reader, and a reader analyzer can analyze the answers to determine if the reader has understood the materials. The reward can be tailored to what the reader is interested in. Different embodiments regarding rewards can be found in U.S. Pat. No. 5,743,746, entitled "Reward enriched learning system and method," which is hereby incorporated by reference.

In one embodiment, a responder can restrict a reader from certain activity under a pre-determined condition. For example, if the reader has not finished reading 10% of the e-book by a certain predetermined amount of time, the responder can restrict the reader from serving the web with the reading device. Different embodiments regarding restriction can be found in U.S. Pat. No. 5,743,743, entitled "Learning method and system that restricts entertainment," which is hereby incorporated by reference.

In one embodiment, a responder can guide to a reader, products/services for the reader to purchase and/or acquire. The product/services can be based on the reader's interest. In one embodiment, the product is not an e-book and is not an expression. The product does not have to be a physical product. For example, a product can be an access to a video game for a duration of time, or a virtual product for an avatar, which can be related to the reader.

In another example, a product can be a reward for a reader, such as a bookmark. Let say after a reader has read the first two chapters of an e-book, a responder can allow the reader to select a bookmark of the reader's choice, and the bookmark can be one of the characters, such as Yoda, Darth Vader, Obiwan and Anakin. After finishing the first three chapters, the reader can select a matching lightsaber to go with the previously selected bookmark.

In yet another example, a product can be recommended to a reader to help the reader understand certain materials. Let say an e-book is about using a piece of software, such as Microsoft Office 2010. A recommended product can be a video showing in details how to include an Adobe Flash video into Microsoft Powerpoint 2010. Let say an e-book is on chemistry for kids. A recommended product can be a crystal growing kit to help a reader understand the concept of super-saturation.

In a further example, a product can enhance the reader's experience in reading an e-book. Let say a reader is reading about the fight between Grievous and Obiwan. A recommended service is a piece of epic music from Star Wars Episode III, which can be played while the reader is reading the fight. This product can be highly entertaining to the reader and enhances the reader's reading experience. Let say another product is a collection of high resolution pictures of Death Star and various TIE fighters. A user may find using such pictures as screen saver entertaining, and the pictures can enhance the reader's reading experience in reading a Star Wars e-book. Such pictures on a reading device can even draw the reader back to reading the e-book when the reader is in another activity. Another way to enhance a reader's reading experience can be to encourage a reader to share her reading experience. Let say the e-book is about gardening. An animated interactive illustration of the e-book is to have the reader grow an orchid. After completing the illustration exercise of growing an Oncidium, a responder can recommend the reader to email a picture of the grown Oncidium to a friend.

In one embodiment, before a reader can read an e-book via a reading device, the device can request the reader to enter an identification or a password. If the identification matches an identification stored in the device, the reader can have access via the reading device to the e-book. In another embodiment, if there are no inputs to a reading device for a predetermined amount of time, the reading device may ask the reader to re-enter the identification. In one embodiment, the identification is with respect to an e-book. A different e-book may need a different identification. Though the reader can use the reading device, the reader cannot read the e-book if the entered identification does not match an identification stored for the e-book.

A number of embodiments have been described regarding an e-book and an e-book reading device. In one embodiment, at least one functionality or a portion of a component of an e-book reading device is in an e-book. In such an embodiment, the e-book reading device can lack certain functionalities to read an e-book (or to enjoy all the functional features provided by the e-book), and in one embodiment, such functionalities can be in a logic sub file of the e-book. Instructions in the logic sub file of the e-book complement or augment instructions in certain functionalities of the reading device. As an example, at least a portion of a reader analyzer is in the logic sub file of an e-book. As yet another example, at least a portion of a reader analyzer, at least a portion of a reader responder and at least a portion of a screen layout engine are in a logic sub file of an e-book.

In one embodiment, instead of all the functionalities of a reader analyzer and a reader responder residing in a reading device, a portion of the reader analyzer and a portion of a reader responder are in a logic sub file of an e-book. As an example, the e-book is a children chapter book on Star Wars with at least four versions, corresponding to four age groups, namely 3-5 (pre-school and kindergarten), 6-8 (grades 1-3), 9-11 (grades 4-6) and 12-13 (middle school). In a screen, for age group from 3 to 5, an image of Yoda and R2D2 are used as background, with the corresponding text having a very large font size. For age group from 6 to 8, an image of General Grievous and Darth Vader are used, with the corresponding text having a large font size. For age group from 9 to 11, an image of a sword fight between Darth Vader and Obiwan is used, with the corresponding text in a regular font size. And for age group from 12 to 13, images of various space vehicles are used, again with the corresponding text in a regular font size. These older kids can click any of the space vehicles to bring in additional materials regarding the vehicles for further reading. The version to be shown on a screen of a display of an e-book reading device depends on the age of the child reading the e-book.

In the above example, a reader monitor (or a reader analyzer) in a reading device can first determine the child's age. Based on the determination, the reader analyzer in the device concludes that since the child is in the age group of 3-13, the children chapter book is appropriate for the child. However, the reading device lacks the functionalities of categorizing the child's age into one of the four sub age groups (which can be performed by a reader analyzer), and of selecting the version to be presented to the child based on the category (which can be performed by a reader responder). At least initially, in one embodiment, these functionalities can reside in the e-book. Based on the age of the child, out of the four age groups, a reader analyzer (or the portion of the reader analyzer), which can be in a logic sub file of the e-book, can categorize the child into one of the age groups or one of the pre-determined categories. Then a reader responder (or the portion of the reader responder), which can be in a logic sub file of the e-book, can select the specific version of the e-book (or can retrieve at least a different section of the e-book) to be presented to the child based on the categorization. To implement such approaches, in one embodiment, when the e-book is downloaded to a reader, the e-book queries the reading device as to whether the reading device has the functionalities to select version to be presented to a reader based on the age of the reader. If the device response is negative, the e-book would download such functionality into the e-book reading device to support such functionalities.

As another example, terms in an e-book can have different definitions or meanings depending on the age of the reader. An e-book includes a dictionary (a reading device can include another dictionary). In one approach, a reader can select a word (which can be a highlighted word) in the e-book, and one of the dictionaries, such as the dictionary in the e-book, is selected to provide the meaning of the word to the reader. Depending on what age group the reader is categorized, the reader can get a different meaning of at least one word. Using the word "force" as an example, for a young reader, its standard dictionary definition may not be as appropriate or interesting as an animation showing Yoda using the force to stop a large concrete column from collapsing onto Anakin and Obiwan. However, an older reader can get a text definition of the word "force" as "The Force is what gives a Jedi his power. It's an energy field created by all living things. It surrounds us, penetrates us, and binds the galaxy together. It could only be harnessed by those with high count of microscopic life forms called midi-chlorians. The highest known midi-chlorian count belonged to the Anakin with over 20,000 per cell." In the text, both the terms Jedi and midi-chlorian can also be highlighted for additional explanation, if selected by a reader.

In one embodiment of the dictionary example, an e-book can include a reader analyzer and a reader responder with the functionality of selecting a dictionary or a meaning of a word based on the age of a child. In another embodiment, an e-book reading device lacks such functionalities. Then in one approach, when the e-book is downloaded to be read at the e-book reading device, such functionalities can be downloaded as well. In yet another embodiment, the e-book includes a dictionary that provides meaning or explanation to words or terms based on the age of a child. And when the e-book is downloaded to a reading device, the dictionary in the e-book can be downloaded also.

In one embodiment, a reading device includes a reader analyzer and one or more general reading rules, while a logic sub file of an e-book includes another reader analyzer and one or more other reading rules, which can be content specific. FIG. 15 shows an example of such a logic sub file in an e-book. In this example, an e-book logic sub file identifies different collections of words or terms in the e-book for different purposes. For example, the e-book is about Star Wars. One collection (first collection) includes "Darth Vader", "Grievous", "Sith", and "Emperor"; and another collection (second collection) includes "Obiwan", "Yoda", "Force", and "Jedi". In this example, both collections of words can be hyperlinked in a text sub file of the e-book for additional information. A reader monitor, which can be in the reading device, monitors the words a reader has selected. The e-book logic sub file includes a reader analyzer, which can be coupled to a reader monitor of the reading device. Based on the words selected by the reader, the analyzer from the e-book generates two counts. The DarkSideCount indicates the number of words selected that belong to the first collection, and the LightSideCount indicates the number of words selected that belongs to the second collection. From the two counts, the reader analyzer from the e-book determines if the reader is more interested in the light or the evil side of the story. A higher count in one indicates the reader's higher interest in that side of the story. Based on such determination, a reader responder can respond accordingly. For example, the responder can introduce different materials for the reader based on the reader's interest.

In yet another embodiment, one or more of (or at least a portion of one or more of) a screen layout module, a note selector, a note editor, a reader monitor, a reader analyzer, a reader responder and a controller reside in an e-book, such as in a logic sub file of the e-book. In one embodiment, when the e-book is being loaded into a reading device, the e-book queries the reading device if the device has one or more of the above components or different features in the different components. In one approach, any components or part of a component or functionalities the device does not have, the e-book would load them into the reading device. Reader permission may be required for the down loading. In yet another embodiment, an e-book is downloaded from a web site, an Internet portal, an e-book club or other locations (wired or wirelessly) to a reading device. The different components mentioned above can be part of the e-book and can reside, with the e-book, in the website, the Internet portal, the book club or other locations, which can query the device if the device has the different components. Any components or part of a component the device does not have, such component(s) can be downloaded into the reading device.

In yet another embodiment, one or more functionalities to read an e-book reside in the e-book. As the e-book is read, the one or more functionalities can be sent or downloaded to the reading device used to read the e-book. For example, a chapter has different versions for children of different age group. When the chapter is about to be read (such as when the immediate previous chapter is being read or retrieved), the e-book downloads or sends the functionality of selecting versions based on age group to the reading device. In one embodiment, without the one or more functionalities, the e-book can still be read, except that the reading experience can be enhanced with the one or more functionalities.

One embodiment includes an e-book with a text sub file and a logic sub file. The text sub file can be configured to store at least a piece of text, together with at least an attribute regarding the text stored. The logic sub file can be configured to include a set of instructions to instruct an e-book reading device on a functionality regarding reading the e-book at the device. The functionality can include analyzing an attribute of the reader regarding reading the e-book, and providing a response to the reader via the device in view of the attribute analyzed. In another embodiment, the e-book further includes an illustration sub file to store at least an illustration, together with at least an attribute regarding the illustration. Either the text sub file or the illustration sub file includes a piece of position information linking the illustration to an area at the at least one piece of text.

The following shows examples of e-books that include one or more functionalities to read the book.

In one approach, the e-book is a textbook to learn a subject, and the e-book is linked to another lecture-note e-book that includes assignments regarding the subject. A reader analyzer in the lecture-note e-book can analyze the progress of the reader. Based on the analysis on the reader's performance level (and may also include instructional needs), a reader responder in the lecture-note e-book can guide different assignments to the reader. Both of the reader analyzer and reader responder can be in a logic sub-file of the lecture-note e-book.

Assume Professor Hopcroft is teaching a class in Automata Theory based on text with a number of chapters in a text e-book, and a lecture-note e-book. Each chapter in the text e-book has its corresponding lecture note in the lecture-note e-book. Materials in the text e-book include illustrations, which are animations of automata such as finite state machines and pushdown automata. The lecture-note e-book includes highlighted areas/terms hyperlinked to areas in the text e-book. For example, terms in automata theory in the lecture-note e-book are linked to their definitions in the text e-book, as well as related theorems, lemmas, corollaries in the text e-book. There are assignments in the lecture-note e-book. And, there are illustrations in the assignments. The lecture-note e-book includes a reader analyzer and a reader responder.

With chapter 2 as an example, Professor Hopcroft puts together 5 animation illustrations within the text e-book and 10 assignment illustrations in the lecture-note e-book. Each student should go through all animation illustrations within the student's text e-book, and 3 of the ten assignments in the student's lecture-note e-book after finishing the text e-book. Assignments in the lecture-note e-book have highlighted areas/terms linked to the text e-book for term definition and various theorems. Each of the 3 assignments includes a hint. If a student has to select all three hints to finish the 3 assignments, Professor Hopcroft believes the student's understanding level is weak and the student will be asked to work on 6 of the remaining 7 assignments to help the student get more practices. The last remaining assignment is a more difficult assignment and is reserved for students who finish all 3 of the required assignments without selecting any hint. The reader analyzer in the lecture-note e-book monitors its corresponding student, and determines how many hints the student has selected. Based on the number of hints the student has selected, the reader responder in the lecture-note e-book will bring in the corresponding number of assignment(s) for the student. Furthermore, the reader responder is programmed to send electronic messages to Professor Hopcroft regarding the student's performance, such as informing the professor of the student working on the more difficult assignment (or the well performing student) or working on the 6 additional assignments (or the poor performing student).

For Chapter 2, Professor Hopcroft schedules a week to finish the text portion of that chapter in the text e-book. The amount of time expected to complete different chapters can be different and such expected time frames are stored in the analyzer of the lecture-note e-book. The reader analyzer monitors the time duration to finish a chapter (both the text and the assignments). For example, the reader analyzer monitors the time between starting the first page to ending the last page of the text of Chapter 2. If the duration is larger than the expected time of one week to finish Chapter 2, the 6 additional assignments will be shown to the student. If a student needs significantly shorter amount of time than the expected time (say 3 days) to finish Chapter 2, the more difficult assignment (assignment 7) will be shown to the student. In both cases, the responder in the lecture-note e-book provides periodic student progress reports to Professor Hopcroft via electronic messages.

In the above examples, the lecture-note e-book and the text e-book are two different e-books. There are other ways to implement a lecture-note e-book. One approach is to integrate the lecture-note e-book with, or make the lecture-note e-book to be, a portion of the text e-book. Professor Hopcroft can make the lecture-note e-book to be an addendum added to the text e-book. Professor Hopcroft can also make the lecture-note e-book to be a revision to the text e-book.

In another approach, e-books with functionalities to read them can be reference e-books, such as a city travel guide; a restaurant guide; a cook-book; a do-it-yourself reference book for gardening, constructing (a building, a driveway pavements etc.), landscaping, home electronics, or home computers; a product user-manual; a photography handbook; or other types of reference books.

Depending in the specialty/industry, the reference e-book includes different specific terms or jargons. A city travel guide could include a number of city names, district names, restaurant names, types of cuisines, cultural terms, and/or city-specific or locale-specific words. A cook-book could include a number of ingredients, cooking techniques, names of dishes, names of chefs and authorities, and/or utensil names for different types of food. A gardening book could include a number of botany terminologies, plant names, planting techniques and/or equipments. A do-it-yourself book could include a number of brands for parts and components, specific terms to do certain tasks, mechanical or operation procedures, and/or special tools. In any event, a reference e-book highlights these terms and hyperlinks texts/illustrations (as annotations) to further explain them. Such illustrations are pictures, animations or videos.

Assume a reference e-book is a city travel guide with information regarding a restaurant named Chef Tom in San Francisco. After a reader has visited the restaurant, the reader can create an annotation and add the annotation to the restaurant in her city travel guide. The annotation can be a picture or video and a piece of descriptive text. In one approach, the reader can allow her annotations to be read by others, such as from an Internet portal. The e-book allows the reader to mark her annotation(s) as sharable. Then other readers reading their own city travel guide would be able to access her annotation. For example, while another reader is reading his city travel guide and comes across Chef Tom, her annotation can be read by this another reader.

An annotation can be on another's annotation. For example, a reader retrieves an annotation created by another reader about the restaurant Chef Tom in the e-book. The reader decides to add a new annotation to the retrieved annotation. If the reader designates the new annotation as sharable, other readers would be able to access both the original annotation with the new annotation.

Richard, a reader of his city travel guide (his e-book), can rank different points of interest. The guide includes a piece of programming logic in a logic sub-file that allows Richard to give a ranking to a point of interest, such as a restaurant, using 1-star to 5-star. This ranking is an annotation to the restaurant. Again in one approach, the annotation is sharable (or can be made sharable by Richard) and can be read by other readers. This can be done via an Internet portal, which can be the portal Richard gets the guide. Other readers can also enter their ranking to the restaurant to their own e-books. In one embodiment, another piece of programming logic in Richard's guide can prompt Richard to enter a ranking to the restaurant. The logic sub-file can also include a piece of programming logic that averages the sharable rankings entered by all readers to create a new annotation for the restaurant. Then Richard reading his guide can see the average ranking, together with individual rankings from different readers about the restaurant.

Assume another reference e-book is a cook book with information on different recipes and the book is read via an Internet portal, a website, or an e-book-reading social networking web entity. In one approach, different readers can read their e-books, and their e-books' content can change as readers add annotations. For example, a reader follows a recipe to create a dish, and he videotapes the cooking process. The reader's e-book allows him to attach the video clip as an annotation to the recipe in the e-book. The reader further adds written comments to the annotation (or as an annotation to the video clip annotation). The comments are on his experience in making the dish, such as substituting a different ingredient, or using a different brand, leading to a longer cooking time, but a tastier dish. For another dish, the reader creates an annotation with a picture of a similar dish he orders in a restaurant. He further adds to the picture annotation on how the presentation, aroma and taste of the restaurant dish differ from the dish made following the recipe in the e-book. And the reader makes each of the above annotations sharable via the Internet portal. Note that if the reader is a renowned food critic, his annotation can be ranked higher (e.g. shown up at the top of the list) than other annotations regarding the dish. Such ranking can be done manually. For example, the Internet portal has editors who could adjust the positioning of the annotation. Another way is based on comments on/rankings of annotations. These comments/rankings can themselves be annotations. A highly ranked annotation moves up the list.

A number of embodiments have been discussed regarding an e-book being read. In one embodiment, an e-book or some of the expressions in the e-book can be listened to through an e-book reading device that includes at least a speaker. In reading out an e-book, the e-book reading device can also announce the page number of the page that is being read.

A number of embodiments have been discussed regarding an e-book. In one embodiment, an e-book can be licensed to a reading device. In one example, the license can be extended to a certain number of reading devices that belong to the reader. In another embodiment, a reading device does not have to acquire the entire e-book, but can acquire certain pages/sections of the e-book, or a portion at a time. In yet another embodiment, the reader gets an e-book based on subscription or rental, and the subscription or rental can be based on time. For example, the reader can pay a fee through or to a website. Then a reading device obtains the e-book from the website, and the reader can start reading the e-book using the reading device. Once the subscription or rental is over, the reader would be stopped from reading the e-book from the reading device.

Different types of e-books may be more applicable to be read by different embodiments. For example, an e-book can be a cookbook with video, a travel book with video, a product menu with video and animation, and textbooks with animation (such as school textbooks), children books, journals, magazines, newspaper and other types of reading materials. In another embodiment, an e-book includes consolidations of reading materials, such as one or more other e-books, journals, newspapers, blogs and/or other materials.

Figure 16A:
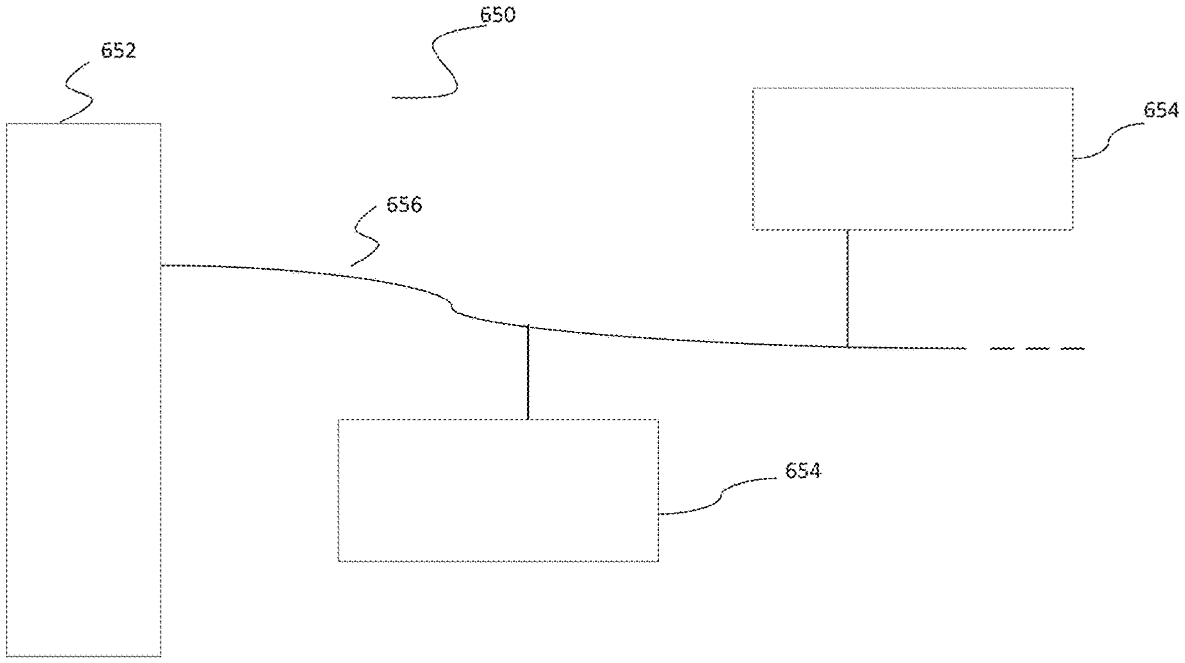
FIGS. 16A-B show examples of hardware to implement one or more embodiments according to the invention.
Figure 16B:
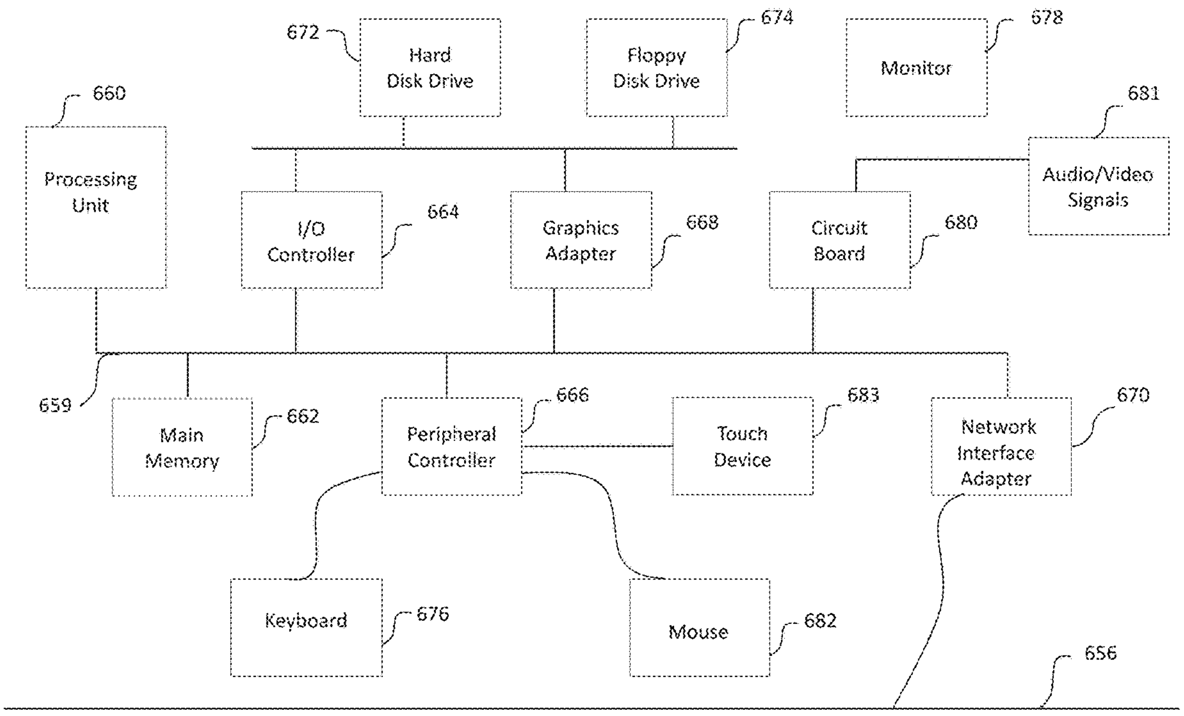

FIGS. 16A-B show examples to implement one or more embodiments, preferably in software and hardware. In FIG. 16A, the embodiment includes a server system and a number of client computers. The server system can include a number of server computers. A client computer can be a personal computer (or computing device), and each client computer can communicate to the server system through a dedicated communication link, a computer network or a network interface.

In one example, a server system 652 includes more than one server computer. For example, a server computer includes a processing unit, a main memory and a network interface. And the server computer can also include or be connected to an external storage unit. The network interface allows the server computer to communicate with different external devices, if any, such as other server computers, an external storage unit and/or a client computer. The external storage unit can be, for example, a harddisk drive, which can be a solid state drive such as Flash memory, a memory card, an USB drive, a floppy disk drive, and an optical disk drive.

In one embodiment, multiple server computers can communicate with each other via a network interface. For example, an e-book club (or a website providing an e-book to a reading device) includes a server computer (or a server system) and another website on newspapers includes another server computer (or another server system). These computers or systems can wired or wirelessly coupled together to communicate with each other.

In one embodiment, a server computer includes a Web server or a software program that runs HTTP protocol or related Web protocols.

FIG. 16B shows one embodiment of a client computer. It typically includes at least a bus 659 connecting a number of components, such as a processing unit 660, a main memory 662, an I/O controller 664, a peripheral controller 666, a graphics adapter 668, a circuit board 680 and a network interface adapter 670. The I/O controller 664 can be connected to components, such as a harddisk drive 672 (which can be a solid state drive such as Flash memory, a removable disk drive such as a memory card, or an USB drive), a floppy disk drive, a removable disk drive, an optical disk drive, or a network attached storage device 674. The peripheral controller 666 can be connected to one or more peripheral components, such as a keyboard 676, a pointing device 682, or a touch device 683. The graphics adapter 668 can be connected to a monitor 678. The circuit board 680 can be coupled to audio or video signals 681; and the network interface adapter 670 can be connected to the network 656, which can be the Internet, an intranet, a wireless network, a mobile cellular network, the Web or other forms of networks. The processing unit 660 can be a microprocessor, a field programmable gate array, or an application specific chip. In another embodiment, a client computer 654 is a thin-client, with less computation capability and memory capacity than the server system, 652. In one embodiment, a client computer 654 includes better computation capability than a server system 652, such as in graphics, video and user interface; in another example, to improve the interaction with readers, a client computer 654 can have higher memory capacity than a server system 652.

In one embodiment, a client computer 654 can be configured as and/or function as an electronic reading device and as one or more of the following: a handheld device, an e-book reader, a smartphone, a notebook, a mini-notebook, a smartbook, a net-top box, a set-top box, a game console, a portable handheld gaming device, a portable computing device, an in-car system, a GPS navigation system, a media telephone, a media player such as an MP3 player or video player or blu-ray player, a digital signage, an electronic kiosk, a computing tablet, a media center, an electronic newspaper or magazine reader, an electronic toy, an electronic dictionary, and an electronic phonebook.

Different elements/systems in different embodiments may be in different components. For example, a reading device may be in a client computer. In another embodiment, a reading device can be in a client computer, and some of the e-book contents being read by the device can be in a storage medium not in the client computer, but in a server system instead. In yet another embodiment, a server system hosts an e-book club or a website providing e-books.

Different systems/components in different embodiments can be implemented in hardware or software or both. For example, a note selector and a note editor of a reading device can be written in software, or can be on a circuit, such as a field-programmable-gate-array, where the program embodying the note editor and note selector is burnt into a circuit. As another example, a processing unit 660 can implement the controller of a reading device; and the same or a different processing unit can implement a reader analyzer in a reading device.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

The invention can be implemented in software, hardware or a combination of hardware and software. A number of embodiments of the invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Also, in this specification, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A handheld mobile device for a user comprising:

a first display configured to display one or more screens of a first size, with each screen being laid out to occupy the first display;

a second display configured to display one or more screens of a second size, with each screen being laid out to occupy the second display; and a storage medium including materials stored therein, with the materials configured to be wirelessly received by the handheld mobile device, and with the materials comprising (a) one or more text sub file including a piece of text, (b) one or more illustration sub file including an illustration, and (c) executable computer program code, wherein the executable computer program code comprises:

computer program code configured to layout at least a first screen of the first size, with the first screen occupying the first display and with the first screen including the piece of text, the illustration and a first annotation, at least by keeping the piece of text, the illustration and the first annotation, to be presented by the handheld mobile device, to fit into the first screen of the first size at least based on (a) determining at least a position to present the piece of text in the first screen of the first size using at least the first size and a font size for the piece of text, and at least a position to present the illustration in the first screen using at least the first size and a size for the illustration, with the determining depending on a piece of data linking the piece of text and the illustration, and (b) determining at least a position for the first annotation in the first screen of the first size using at least the first size and a size of the first annotation; and computer program code configured to make a determination regarding at least whether the piece of text and the illustration are able to fit into a first screen of the second size, with the first screen occupying the second display, and (a) to layout at least the first screen of the second size, with the first screen not including the piece of text and the illustration, if the determination determines that at least the piece of text and the illustration are not able to fit into the first screen of the second size, and (b) to layout at least the first screen of the second size, with the first screen including the piece of text and the illustration, if the determination determines that at least the piece of text and the illustration are able to fit into the first screen of the second size, wherein the second size is different from the first size, wherein the first annotation is related to materials presented in the first screen of the first size, and wherein the executable computer program code comprises computer program code configured to keep track of progress of the user.

2. A handheld mobile device as recited in claim 1, wherein the computer program code configured to layout at least the first screen of the second size, with the first screen including the piece of text and the illustration, is based on determining at least a position to present the piece of text in the first screen using at least the second size and a font size of the piece of text, and at least a position to present the illustration in the first screen using at least the second size and a size of the illustration, with the determining depending on a piece of data linking the piece of text and the illustration.

3. A handheld mobile device as recited in claim 1, wherein the first annotation includes a piece of text and an illustration.

4. A handheld mobile device as recited in claim 1, wherein the first annotation includes an audio clip.

5. A handheld mobile device as recited in claim 1 comprising an input device configured to receive inputs entered by the user into the device, wherein the first annotation is entered by the user via the input device.

6. A handheld mobile device as recited in claim 5, wherein the first annotation is accessible by other users via at least the Internet.

7. A handheld mobile device as recited in claim 1, wherein the first annotation is from a person and not the user, and is wirelessly received by the device.

8. A handheld mobile device as recited in claim 1, wherein the first annotation is received by the handheld mobile device at least via the Internet.

9. A handheld mobile device as recited in claim 1, wherein the first annotation is received by the handheld mobile device at least via a network-based portal.

10. A handheld mobile device as recited in claim 1, wherein the first screen of the first size is configured to include a plurality of annotations to be presented by the handheld mobile device, to fit into an area in the first screen of the first size, with the plurality of annotations including the first annotation.

11. A handheld mobile device as recited in claim 10, wherein the area is configured to be at left side of the first screen of the first size.

12. A handheld mobile device as recited in claim 10, wherein the area is configured to be at right side of the first screen of the first size.

13. A handheld mobile device as recited in claim 10, wherein the plurality of annotations are received by the handheld mobile device at least via a network-based portal.

14. A handheld mobile device as recited in claim 13, wherein the plurality of annotations received by the handheld mobile device at least via the network-based portal are ranked.

15. A handheld mobile device as recited in claim 10, wherein one annotation is configured to be presented by the handheld mobile device before at least another annotation in the plurality of annotations at least in view of the one annotation being ranked higher than the another annotation.

16. A handheld mobile device as recited in claim 10, wherein at least two of the annotations in the plurality of annotations are configured to be grouped together based on the two annotations being from same person.

17. A handheld mobile device as recited in claim 10, wherein at least two of the annotations in the plurality of annotations are configured to be grouped together based on the two annotations being on same subject matter.

18. A handheld mobile device as recited in claim 1, wherein the executable computer program code includes computer program code configured to determine, at least based on the first size, whether to present another annotation in the first screen of the first size.

19. A handheld mobile device as recited in claim 1, wherein the first annotation at least provides information regarding ranking.

20. A handheld mobile device as recited in claim 1, wherein the progress of the user configured to be kept track of is at least regarding materials in the first screen of the first size presented to the user.

21. A handheld mobile device as recited in claim 1, wherein the piece of data linking the piece of text and the illustration includes position data to link the piece of text to the illustration.

22. A handheld mobile device as recited in claim 1,
wherein the first screen of the second size is configured to include a second annotation, and
wherein to layout at least the first screen of the second size, with the first screen including the piece of text and the illustration, is configured to at least keep the piece of text with the illustration and the second annotation, to be presented by the handheld mobile device, to fit into the first screen of the second size.

23. A handheld mobile device as recited in claim 22, wherein the first screen of the second size is configured to include a plurality of annotations to be presented by the handheld mobile device, to fit into an area in the first screen of the second size, with the plurality of annotations including the second annotation.

24. A handheld mobile device as recited in claim 1, wherein the executable computer program code comprises computer program code configured to access at least the piece of text and the illustration for the layout of at least the first screen of the first size, based on at least the user being monitored.

25. A handheld mobile device as recited in claim 1, wherein the handheld mobile device is configured to be operable at least as a mobile phone.

26. A handheld mobile device as recited in claim 1, wherein the executable computer program code comprises computer program code configured to layout a screen including a section in the materials, with the section covering at least the center of the screen, based on at least the user being monitored.

27. A handheld mobile device for a user comprising:
a first display configured to display one or more screens of a first size, with each screen being laid out to occupy the first display;
a second display configured to display one or more screens of a second size, with each screen being laid out to occupy the second display; and
a storage medium including materials stored therein, with the materials configured to be wirelessly received by the handheld mobile device, and with the materials comprising (a) one or more text sub file including a piece of text, (b) one or more illustration sub file including an illustration, and (c) executable computer program code,
wherein the executable computer program code comprises:
computer program code configured to layout at least a first screen of the first size, with the first screen occupying the first display and with the first screen including the piece of text, the illustration and a first annotation, at least by keeping the piece of text, the illustration and the first annotation, to be presented by the handheld mobile device, to fit into the first screen of the first size at least based on
(a) determining at least a position to present the piece of text in the first screen of the first size using at least the first size and a font size for the piece of text, and at least a position to present the illustration in the first screen using at least the first size and a size for the illustration, with the determining depending on a piece of data linking the piece of text and the illustration, and
(b) determining at least a position for the first annotation in the first screen of the first size using at least the first size and a size of the first annotation,
with at least the piece of text and the illustration accessed for the layout of at least the first screen of the first size, based on at least the user being monitored; and computer program code configured to layout at least the first screen of the second size, with the first screen occupying the second display and with the first screen including the piece of text and the illustration, based on determining at least a position to present the piece of text in the first screen using at least the second size and a font size of the piece of text, and at least a position to present the illustration in the first screen using at least the second size and a size of the illustration, to fit the piece of text and the illustration into the first screen of the second size, with the determining depending on a piece of data linking the piece of text and the illustration, wherein the second size is different from the first size, wherein the first annotation is related to materials presented in the first screen of the first size, and wherein progress of the user at least regarding materials in the first screen of the first size presented to the user is being kept track of.

28. A handheld mobile device as recited in claim 27, wherein the executable computer program code comprises computer program code configured to layout a screen including a section in the materials stored in the storage medium, with the section covering at least the center of the screen, based on at least the user being monitored.

29. A handheld mobile device for a user comprising:

a first display configured to display one or more screens of a first size, with each screen being laid out to occupy the first display;

a second display configured to display one or more screens of a second size, with each screen being laid out to occupy the second display; and a storage medium including materials stored therein, with the materials configured to be wirelessly received by the handheld mobile device, and with the materials comprising (a) one or more text sub file including a piece of text, and (b) one or more illustration sub file including an illustration, wherein the handheld mobile device comprises executable computer program code including:

computer program code configured to layout at least a first screen of the first size, with the first screen occupying the first display and with the first screen including the piece of text and the illustration to be presented by the handheld mobile device, wherein the layout is configured at least to keep the piece of text and the illustration together to fit into the first screen of the first size at least based on (a) determining at least a position to present the piece of text in the first screen of the first size using at least the first size and a font size for the piece of text, (b) determining at least a position to present the illustration in the first screen using at least the first size and a size for the illustration, and (c) linking data at least to link the piece of text and the illustration; and computer program code configured to layout at least a first screen of the second size, with the first screen occupying the second display and with the first screen including the piece of text and the illustration to be presented by the handheld mobile device, wherein the layout is configured at least to keep the piece of text and the illustration together to fit into the first screen of the second size at least based on (a) determining at least a position to present the piece of text in the first screen of the second size using at least the second size and a font size for the piece of text, (b) determining at least a position to present the illustration in the first screen using at least the second size and a size for the illustration, and (c) linking data at least to link the piece of text and the illustration, wherein the second size is different from the first size.

30. A handheld mobile device as recited in claim 29, wherein the linking data for the first screen of the first size includes position data, and wherein the computer program code configured to layout at least the first screen of the first size is configured to use at least the position data to keep the illustration and the piece of text together to be presented in the first screen of the first size by the handheld mobile device.

31. A handheld mobile device as recited in claim 30, wherein based on the position data, the piece of text is configured to be positioned below the illustration to be presented by the handheld mobile device.

32. A handheld mobile device as recited in claim 30, wherein based on the position data, the piece of text is configured to be positioned above the illustration to be presented by the handheld mobile device.

33. A handheld mobile device as recited in claim 30, wherein based on the position data, the illustration, instead of being above or below, is configured to be positioned on a side of the piece of text, to be presented by the handheld mobile device.

34. A handheld mobile device as recited in claim 29, wherein the linking data for the first screen of the first size includes data to prevent the piece of text and the illustration to be in different screens, and wherein the computer program code configured to layout at least the first screen of the first size is configured to use at least the linking data to prevent the piece of text and the illustration to be in different screens, to keep the piece of text and the illustration together to be presented in the first screen of the first size by the handheld mobile device.

35. A handheld mobile device as recited in claim 29, wherein the illustration has a scale, wherein the linking data for the first screen of the first size includes data regarding scaling, and wherein the computer program code configured to layout at least the first screen of the first size is configured to use at least the data regarding scaling to change the scale of the illustration to fit the illustration into the first screen of the first size, to present the illustration in the first screen of the first size by the handheld mobile device.

36. A handheld mobile device as recited in claim 35, wherein at least based on the data regarding scaling, the change of the scale is limited to a predetermined value.

37. A handheld mobile device as recited in claim 29, wherein the linking data for the first screen of the first size includes data regarding font size, and wherein the computer program code configured to layout at least the first screen of the first size is configured to use at least the data regarding font size to change the font size of the piece of text in view of available space in the first screen of the first size, to present the piece of text in the first screen of the first size by the handheld mobile device.

38. A handheld mobile device as recited in claim 29, wherein at least one of the displays is an e ink display.

39. A handheld mobile device as recited in claim 29, wherein the linking data for the first screen of the first size includes an illustration ID corresponding to the illustration.

40. A handheld mobile device as recited in claim 29, wherein the linking data for the first screen of the first size includes a group construct containing (i) an illustration ID corresponding to the illustration, and (ii) data regarding the piece of text.

41. A handheld mobile device as recited in claim 29, wherein the linking data for the first screen of the first size includes a group construct containing (i) an illustration ID corresponding to the illustration, (ii) data regarding the piece of text, (iii) a layout preference for the illustration, and (iv) data linking the piece of text and the illustration.

42. A handheld mobile device for a user comprising:

a first display configured to display one or more screens of a first size, with each screen being laid out to occupy the first display;

a second display configured to display one or more screens of a second size, with each screen being laid out to occupy the second display; and a storage medium including materials stored therein, with the materials configured to be wirelessly received by the handheld mobile device, and with the materials comprising (a) one or more text sub file including a piece of text, and (b) one or more illustration sub file including an illustration, wherein the handheld mobile device comprises executable computer program code including:

computer program code configured to layout at least a first screen of the first size, with the first screen occupying the first display and with the first screen including the piece of text and the illustration to be presented by the handheld mobile device, wherein the layout is configured at least to keep the piece of text and the illustration together to fit into the first screen of the first size at least based on (a) determining at least a position to present the piece of text in the first screen of the first size using at least the first size and a font size for the piece of text, (b) determining at least a position to present the illustration in the screen using at least the first size and a size for the illustration, and (c) position data at least to keep the illustration and the piece of text together to fit into the first screen of the first size; and computer program code configured to layout at least a first screen of the second size, with the first screen occupying the second display and with the first screen including the piece of text and the illustration to be presented by the handheld mobile device, wherein the layout is configured at least to keep the piece of text and the illustration together to fit into the first screen of the second size at least based on (a) determining at least a position to present the piece of text in the first screen of the second size using at least the second size and a font size for the piece of text, (b) determining at least a position to present the illustration in the first screen using at least the second size and a size for the illustration, and (c) position data at least to keep the illustration and the piece of text together to fit into the first screen of the second size, wherein the second size is different from the first size.

* * * * *